United States Patent
Hill et al.

(10) Patent No.: US 11,292,134 B2
(45) Date of Patent: Apr. 5, 2022

(54) CASE INSPECTION AND MANUFACTURING METHOD

(71) Applicant: Pearson Packaging Systems, Spokane, WA (US)

(72) Inventors: Timothy Lynn Hill, Spokane Valley, WA (US); Pete Lawton, Spokane Valley, WA (US); Daniel Vincent Brown, Rosalia, WA (US); Joshua A. Burright, Spokane, WA (US); Baran T Thompson, Nine Mile Falls, WA (US); Michael Donavien Williams, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 107 days.

(21) Appl. No.: 16/719,897

(22) Filed: Dec. 18, 2019

(65) Prior Publication Data
US 2020/0198281 A1 Jun. 25, 2020

Related U.S. Application Data

(60) Provisional application No. 62/787,144, filed on Dec. 31, 2018, provisional application No. 62/782,052, filed on Dec. 19, 2018.

(51) Int. Cl.
*B31B 50/00* (2017.01)
*B25J 9/16* (2006.01)
(Continued)

(52) U.S. Cl.
CPC .......... *B25J 9/1687* (2013.01); *B25J 9/1612* (2013.01); *B25J 9/1664* (2013.01); *B31B 50/005* (2017.08);
(Continued)

(58) Field of Classification Search
CPC ....... G01B 11/22; G01B 11/03; B31B 50/005; B31B 50/006; B31B 50/76; B31B 50/784;
(Continued)

(56) References Cited

U.S. PATENT DOCUMENTS 5,212,656 A * 5/1993 Clary ................. G01B 11/04
702/84
5,342,278 A * 8/1994 Kurandt ............... B65H 29/62
493/16

(Continued)

OTHER PUBLICATIONS

PCT Search Report, and Written opinion dated May 5, 2020 for PCT Application No. PCT/US2019/067258, 13 pages.

*Primary Examiner* — Thomas M Wittenschlaeger
(74) *Attorney, Agent, or Firm* — Lee & Hayes, P.C.

(57) ABSTRACT

Techniques for corrugate and chipboard knocked-down case inspection and manufacturing are described. In an example, a piece of cardboard is cut according to a shape of a knocked-down case, and a first plurality of measurements are made. The piece of cut cardboard is scored to create a plurality of fold-lines, based at least in part on the first plurality of measurements, and a second plurality of measurements are made. A fold-line between a major panel and a minor panel is folded, based at least in part on the second plurality of measurements, and a third plurality of measurements are made. A fold-line of a tab of the piece of cut cardboard is folded, based at least in part on the third plurality of measured distances. The tab is glued to a panel of the piece of cardboard to form a knocked-down case.

19 Claims, 28 Drawing Sheets

(51) Int. Cl.
  *G01B 11/02* (2006.01)
  *G01B 11/03* (2006.01)
  *G06K 7/14* (2006.01)
  *G06K 19/06* (2006.01)
  *B31B 50/78* (2017.01)
  *B31B 120/30* (2017.01)

(52) U.S. Cl.
  CPC .......... *B31B 50/006* (2017.08); *B31B 50/784* (2017.08); *G01B 11/022* (2013.01); *G01B 11/03* (2013.01); *G06K 7/1417* (2013.01); *G06K 19/06037* (2013.01); *B31B 2120/302* (2017.08)

(58) Field of Classification Search
  CPC ..... B31B 50/003; B31B 50/78; B31B 50/786; B31B 50/787; B31B 50/80; B31B 50/802; B31B 50/804; B31B 2100/0022; B31B 2120/302; B31B 2120/102; B25J 9/1687; B25J 9/1612; B25J 9/1664; G06K 19/06037; G06K 7/1417
  See application file for complete search history.

(56) References Cited

U.S. PATENT DOCUMENTS

| | | | |
|---|---|---|---|
| 8,073,239 B1* | 12/2011 | Bahrami | G06T 7/001 |
| | | | 382/143 |
| 8,480,550 B2* | 7/2013 | Taketsugu | B65H 29/62 |
| | | | 493/29 |
| 10,093,438 B2* | 10/2018 | Pettersson | B65B 59/001 |
| 10,273,042 B1* | 4/2019 | Kolodziey | B65D 5/54 |
| 10,279,941 B2* | 5/2019 | Hansen | B31B 50/78 |
| 10,703,063 B2* | 7/2020 | Heath | B31B 50/804 |
| 10,977,749 B2* | 4/2021 | Widner | G06F 17/18 |
| 2003/0040413 A1* | 2/2003 | Malecki | B65B 59/003 |
| | | | 493/309 |
| 2012/0053036 A1* | 3/2012 | Bruns | B31B 50/00 |
| | | | 493/128 |
| 2013/0184133 A1* | 7/2013 | Sugimoto | B65H 29/62 |
| | | | 493/29 |
| 2017/0323400 A1* | 11/2017 | Widner | G05B 19/418 |
| 2017/0348940 A1* | 12/2017 | Amoros | B07C 5/342 |
| 2020/0023603 A1* | 1/2020 | Akita | B31B 50/07 |
| 2020/0198143 A1 | 6/2020 | Hill et al. | |
| 2020/0198280 A1 | 6/2020 | Hill et al. | |
| 2020/0391470 A1* | 12/2020 | Shigeyama | B31B 50/005 |

* cited by examiner

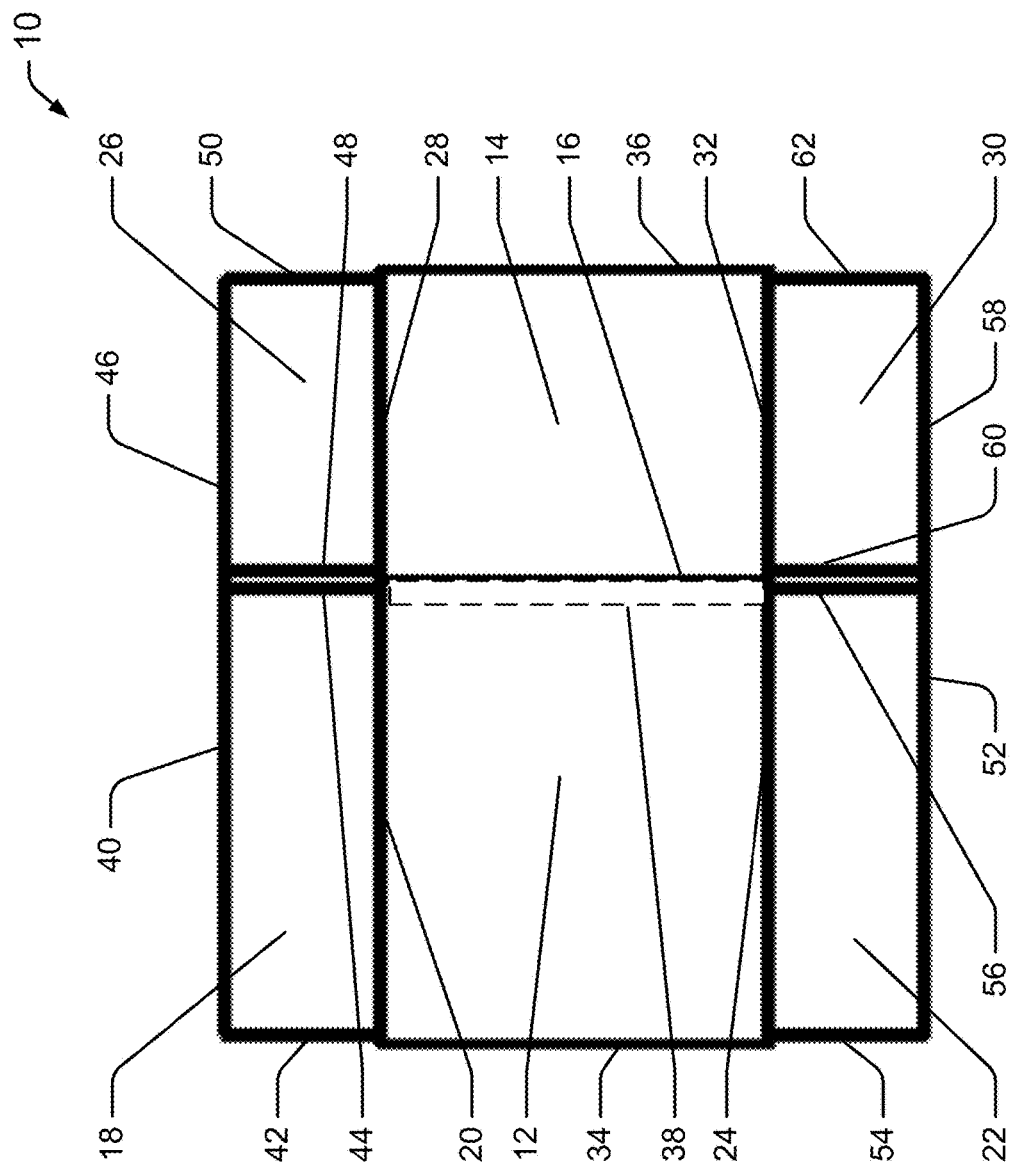

CASE INSPECTION AND MANUFACTURING METHOD

RELATED APPLICATIONS

This patent application claims the benefit of priority to U.S. provisional patent application Ser. No. 62/782,052, titled "Corrugate and Chipboard Knockdown Inspection System and Method", filed on 19 Dec. 2018, and to U.S. provisional patent application Ser. No. 62/787,144, titled "Corrugate and Chipboard Knockdown Inspection System and Method", filed on 31 Dec. 2018, both of which are incorporated herein by reference.

BACKGROUND

Case erecting and sealing must be performed to result in a case that is within prescribed dimensions. Improved systems are needed to determine if dimensions of case fabrication materials, knocked-down cases, erected cases, and/or sealed cases are within specified dimensions and/or ranges of dimensions.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 1A shows a first side of an example knocked-down case.

DETAILED DESCRIPTION

Overview

Figure 1B:
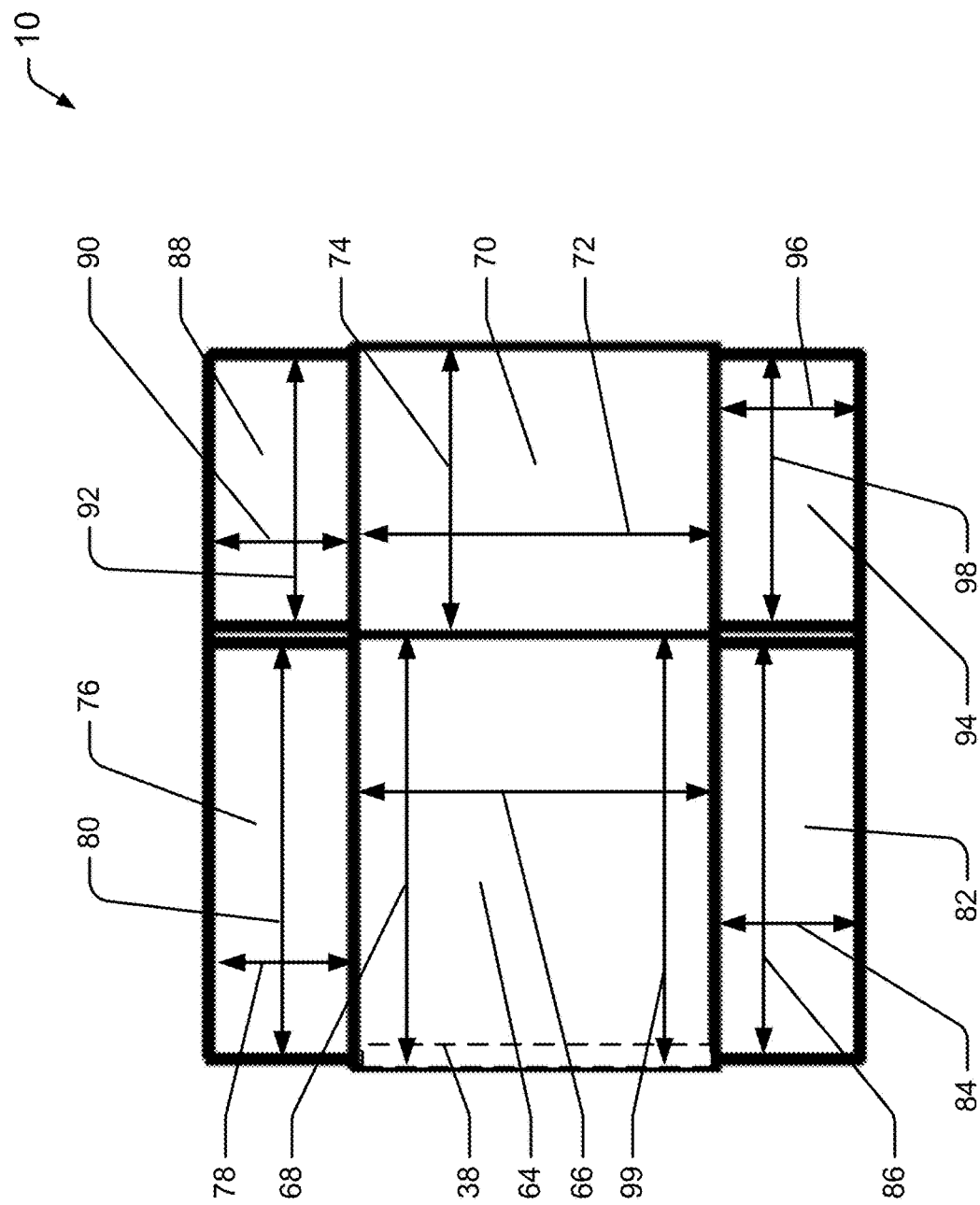
FIG. 1B shows a second side of the example knocked-down case.

The disclosure describes several systems and methods and their applications, including techniques for assembling a knocked-down case from a folded-flat condition to a fully erected and sealed case.

Example Systems

FIG. 1A shows a first side of an example knocked-down case 10. In the view shown, a major panel 12 is somewhat larger than a minor panel 14, which will result in a rectangular case upon erection of the case. In the example of a square case (i.e., a case with a square footprint), the major and minor panels would be same size. The case 10 may be made or cardboard, chipboard, or other material, depending on job requirements.

In the example, the major panel 12 is connected to the minor panel 14 along a score line 16. A score line or channel line, such as score line 16, is a recess or indentation that promotes a leaner, more even fold. The fold at the score line 16 will be made when the knocked-down case 10 is erected.

The major panel 12 is attached to an upper major flap 18 at score line 20 and is attached to a lower major flap 22 at score line 24. The minor panel 14 is attached to an upper minor flap 26 at score line 28 and a lower minor flap 30 at score line 32.

The knocked-down case 10 has a fold 34 between the major panel 12 and a minor panel (not seen in this view). The knocked-down case 10 also has a fold 36 between a major panel (not seen in this view) and a minor panel 14.

The upper major flap 18 is bounded by a longer or major edge 40 and shorter minor edges 42, 44. The upper minor flap 26 is bounded by a longer or major edge 46 and shorter minor edges 48, 50.

The lower major flap 22 is bounded by a longer or major edge 52 and shorter minor edges 54, 56. The lower minor flap 30 is bounded by a longer or major edge 58 and shorter minor edges 60, 50.

At gap is defined between edge 44 of the upper major flap 18 and the edge 48 of the upper minor flap 26. The gap reduces contention and binding between the flaps 18, 26 as one is closed. A gap that is too wide may result in a sealed case that does not fully enclose its contents. A gap that is too narrow may result in binding, flap-conflict and failure as the flaps of the case to close during the erecting and/or sealing processes. Gaps are defined between both upper major flaps and adjacent upper minor flaps. Gaps are also defined between both lower major flaps and adjacent lower minor flaps. Such gap widths and/or a range of widths may be indicated by a case specification.

During manufacture of the knocked-down case 10, the tab 38 may be glued, taped or otherwise fastened, typically to an inside surface of the minor panel 14. While the tab 38 is shown attached at a score line 16 of the minor panel 14, the score line could alternatively be folded. Alternatively, the score line could be part of the major panel 12, and the tab could be glued to the minor panel 14. As shown, the knocked-down case 10 may be considered a "left hand case," because the major panel is to the left of the "seam" (the glued flap 38). The seam where the major flap 12 and minor flap 14 are connected by the glued tab 38 may also be called a "manufacturer's joint," since it is a connection made by the manufacturer of the knocked-down case. This is in contrast to the taped or glued flaps that are sealed in the course of case-erection, and (after the erected case is filled with product) case-sealing.

FIG. 1B shows the reverse side of the knocked-down case 10. Accordingly, the glued tab or flap 38 is on the opposite side. A second major panel 64 (the first major panel 12 is seen in FIG. 1A) has height 66 and width 68. A second minor panel 70 has height 72 and width 74. A second upper major flap 76 has height 78 and width 80. A second lower major flap 82 has height 84 and width 86. A second upper minor flap 88 has height 90 and width 92. A second lower minor flap 94 has height 96 and width 98.

FIG. 1B also shows that the distance between two features of a knocked-down case may be measured twice. Comparison of the two measurements can provide information on the "squareness" of a knocked-down case (or a case in the process of manufacture). In the example shown, the width 68 of the major panel 64 is measured at 68 and 99. If the measurements are the same, the panel is "square," and adjustment may not be required (such as by a flap-closing or score-folding tool). However, if the measurements 68 and 99 are not the same, adjustment to the actions of one or more case-handling tools may be indicated.

Figure 1C:
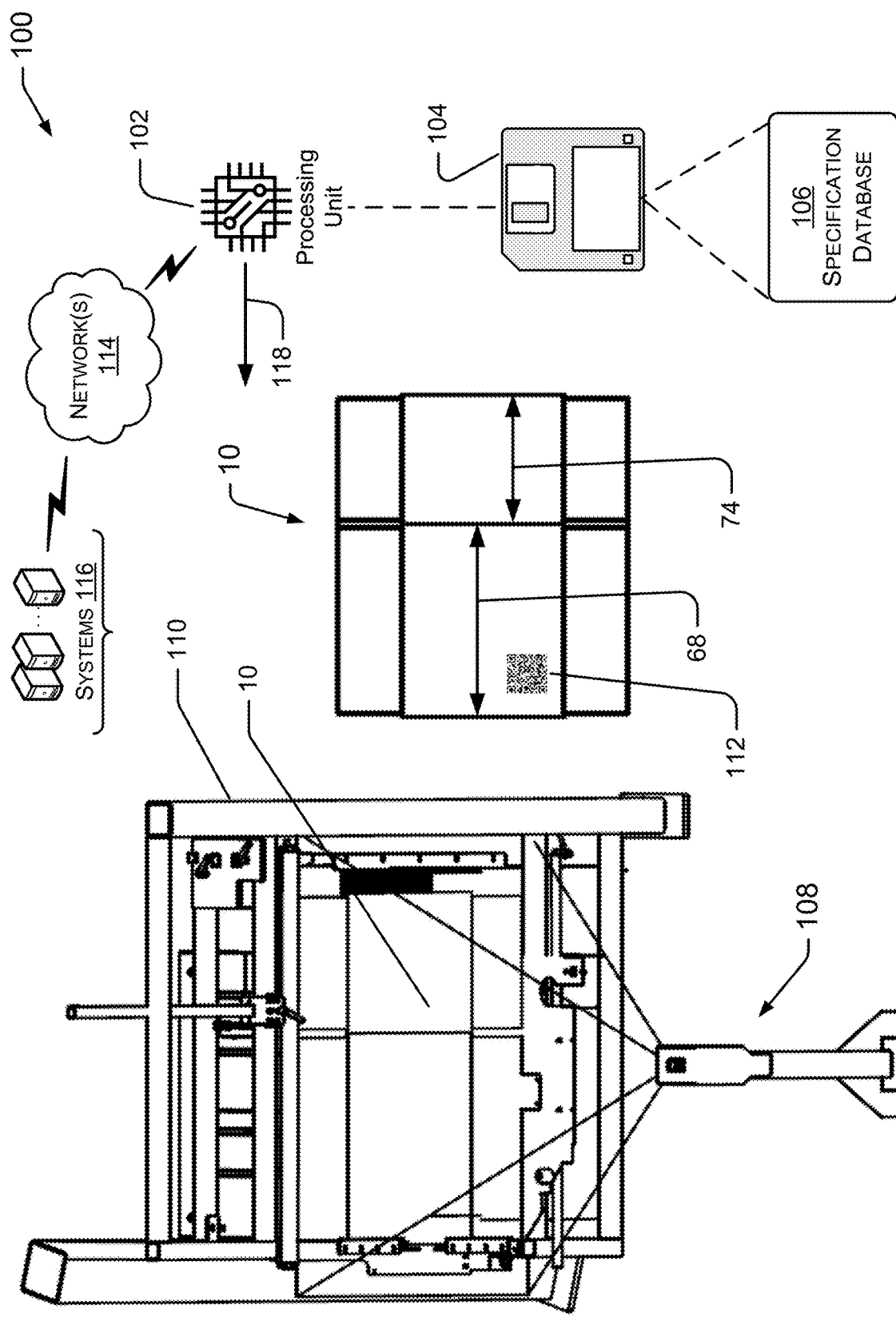
FIG. 1C shows an example data acquisition system, which for purposes of the example includes an optical scanning apparatus.

FIG. 1C shows an example data acquisition system 100. The data acquisition system 100 may be controlled at least in part by the processor 102, programming and data in memory 104, and/or a database 106, which may be defined in the memory 104 or an alternative location. The memory icon 104 is representative of RAM, ROM, processor memory, disks, etc.

In example operation, a sensor apparatus scans a knocked-down case 10 to determine one or more dimensions of the case. In the example shown, the data acquisition system 100 may include a camera 108. The camera 108 may be supplemented by laser(s), which may simplify the scanning process.

The camera 108 is representative of any data acquisition system, including systems based on optical sensors, mechanical tools (e.g., calipers), electro-magnetic devices, sonar, radar, infrared, and other technologies. Mechanical sensors may include calipers, probes, plates, or other tools that press against and/or otherwise determine a size of a case or part of a case. Hybrid systems may be used, such as a partly optical and partly mechanical system. One or more sensor apparatus 108 may be configured to accurately measure distances between edges, scores, folds, taped or glued seems, etc. of the knocked-down case 10. In some examples, one side of the knocked-down case 10 is measured, while in other examples both sides are measured. In an example, a camera 108 may be supplemented by lasers, which "paint" a grid on the knocked-down case that assists in the In the example, the knocked-down case 10 is shown in within a magazine or cassette 110, which may contain a plurality of knocked-down cases. The magazine 110 is representative of any of: a cassette; a staging area; and/or any other location suitable for viewing, scanning and/or measuring the knocked-down case 10. The knocked-down case 10 is also shown separated within a cassette or magazine, to show to dimensions 68, 74 that are representative of the areas of measurement (e.g., measurements shown in FIG. 1B) that may be measured by the data acquisition system 100.

In an example, indicia 112 may be associated with the case 10. The indicia may include any type of printed, scannable, or other type of information-conveying technology. In examples, the indicia comprise a QR code 112, bar code, text, etc. In one example implementation, the indicia (e.g., a barcode or QR code) may be a link to a website, which allows the system 100 to download information over the internet or other network 114 from a remote server 116.

The indicia 112 may include data related to: the type or name of the type of the case; the dimensions of that type of case; and/or the dimensions of the specific case (i.e., the case on which the indicia are printed); or other data.

In examples identifying the type of case, the type be identified by industry terms, a name or model number of the case, or other identifying information.

In some examples, the standardized or specification-dimensions or ranges of dimensions of the case-type may be included. Such data may include specified dimensions for a knocked-down case and/or for an erected case. The data may indicate a material of the case, a weight of the case, etc. The dimensions may include little detail (e.g., Width=10", Length=18", Height=8"). The dimensions may include much greater detail, such as the dimensions described by FIG. 1B and/or additional dimensional information. Any desired information may be included, as need for a particular implementation.

The indicia (e.g., QR code) may also include the actual measured dimensions of the specific case having the indicia. Accordingly, the case type, case specifications, and actual case measurements may all be available. The actual measurements may include some or all of the measurements discussed with respect to FIG. 1B and/or other measurements.

The data acquisition system 100 may be controlled by a processor 102 and computer instructions defined in a memory device 104 (shown by generic graphic that represents any type of random-access memory (RAM) device, read-only memory (ROM) device, internally-defined or stored processor instructions, etc.).

In operation, the data acquisition system 100 may use scanner(s) to obtain a plurality of measurements of the knocked-down case 10. Measurements may be made between any two case aspects (e.g., mix or match), such as edges, scores, folds, taped or glued seems, etc. In several examples (meant to be only a representative list and not an exhaustive list), a length 68 of the knocked-down case 10 may be measured between a folded edge 34 and a score 16. In another example, a width 74 of the knocked-down case 10 may be measured between a folded edge 36 and the score 16. A height of the knocked-down case may be measured between an upper edge 40 of an upper flap 18 and a lower edge 52 of a lower flap 22. Other measurements may be made to determine the dimensions of upper minor flaps, upper major flaps, minor panels, major panels, lower minor flaps, lower major flaps, spacing between adjacent upper flaps, spacing between adjacent lower flaps, etc.

A specification or specification database 106 for knocked-down case(s) may include preferred or target measurements for a plurality of aspects of the knocked-down case. Additionally, or alternatively, ranges of preferred or target measurements for a case may be included in the specification database 106. The system 100 may be controlled at least in part by the processor 102, memory 104 and/or database 106.

Control signals 118 may be generated by the processor 102 and sent to any case-handling tool (e.g., scanner 108 and/or any of the tools associated with FIGS. 1-15, etc.).

Figure 1D:
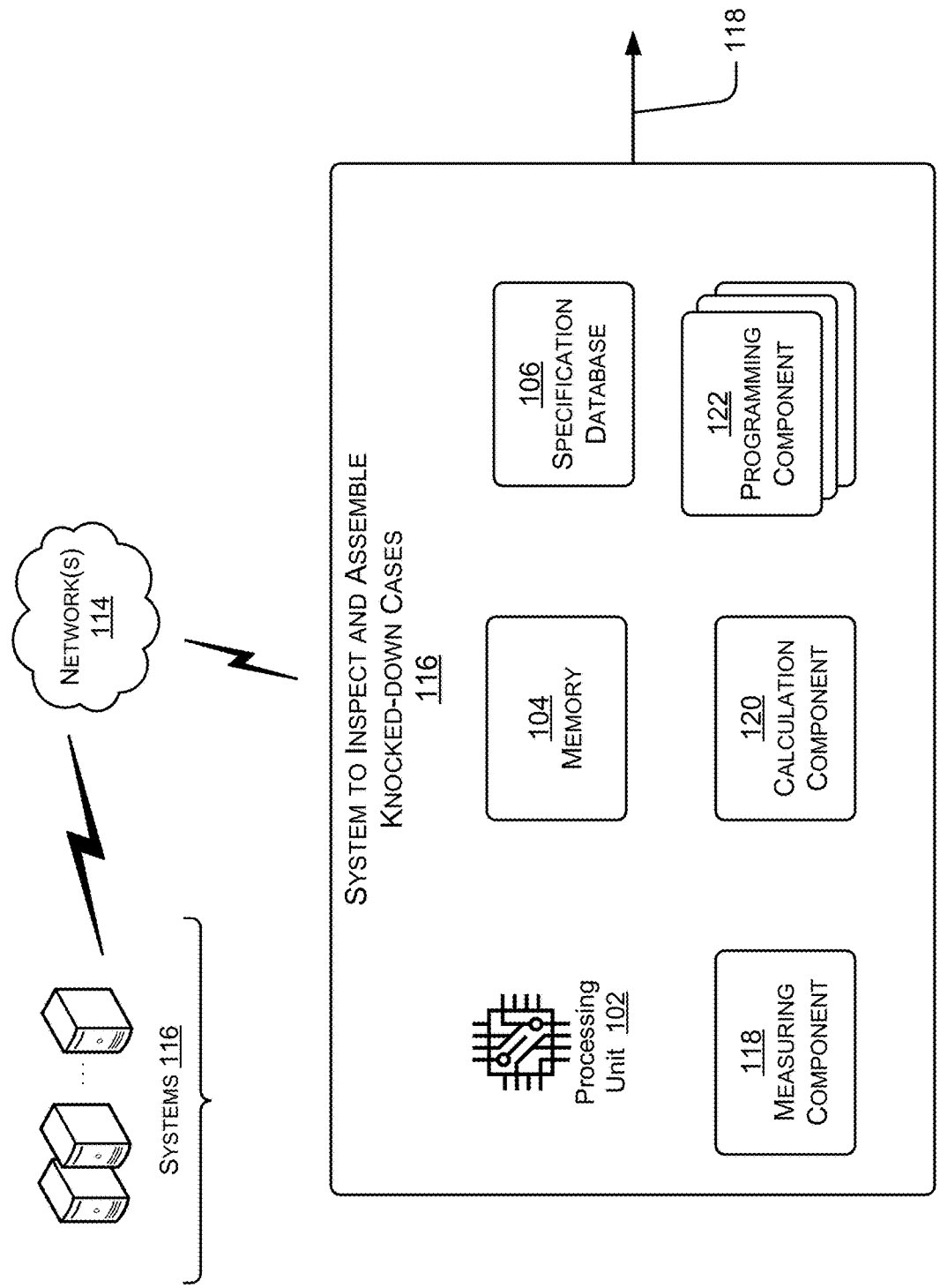
FIG. 1D shows an example system to inspect and assemble knocked-down cases.

FIG. 1D shows an example system 116 to inspect and assembly knocked-down cases. In an example, the system includes a processor 102, in communication with the memory device 104. A measuring component 118 may be configured a scanner (e.g., scanner 108 of FIG. 1C) to obtain a measurement of an aspect of the knocked-down case. Alternatively, the measuring component 118 may obtain measurements by means such as reading a QR code or other indicia from the case, or obtaining the measurements from remote servers 116 over networks 118 (e.g., the internet). Accordingly, the measuring component 118 obtains the measurements, which may have been measured locally, remotely, etc.

A calculation component 120 may be used to determine a difference between the obtained measurement and a standard measurement. In an example, the calculating component 120 may be programming executed by the processing unit 102, and may be defined in memory (e.g., device 104).

One or more programming components 122 may be executed by the processor 102. In an example, the programming component generates control signals 118 to operate one or more case-handling tools, such as the tools discussed at FIGS. 1 through 23. In an example, each of a plurality of programming components is associated with, and provides control signals to, a respective one of a plurality of case-handling tools.

Each programming component 122 may be configured based at least in part on output from at least one of the measuring component 118 and the calculation component 120. In an example, adjustment of each programming component may be required, based on the differences in measurements from standard measurements and/or standard ranges of measurements. Such adjustment or configuration may be performed by use of variable-settings, input- or adjustment-data, substituted program statements, etc. Accordingly, some adjustment of the control signals 118 may result based on input from the measuring component 118 and/or calculation component 120.

FIGS. 2 through 14 show different stages in the assembly of a case.

Figure 2:
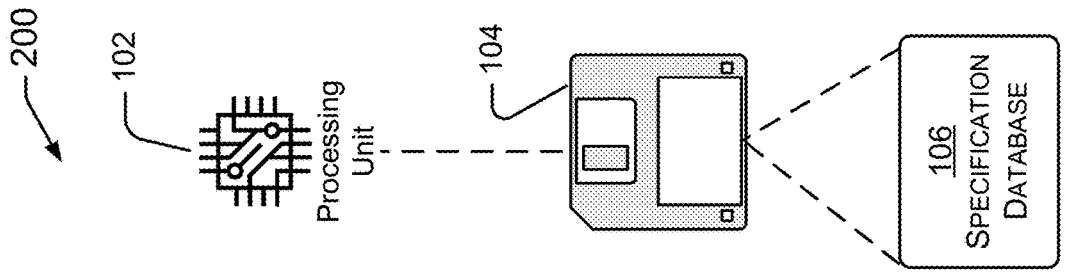
FIG. 2 shows a robotic arm and end-of-arm tool and example operation wherein a location of a pick-off point on a knocked-down case may be adjusted based at least in part on dimensions of the knocked-down case and/or differences between dimensions of the knocked-down case and specifications for the case.
Figure 2:
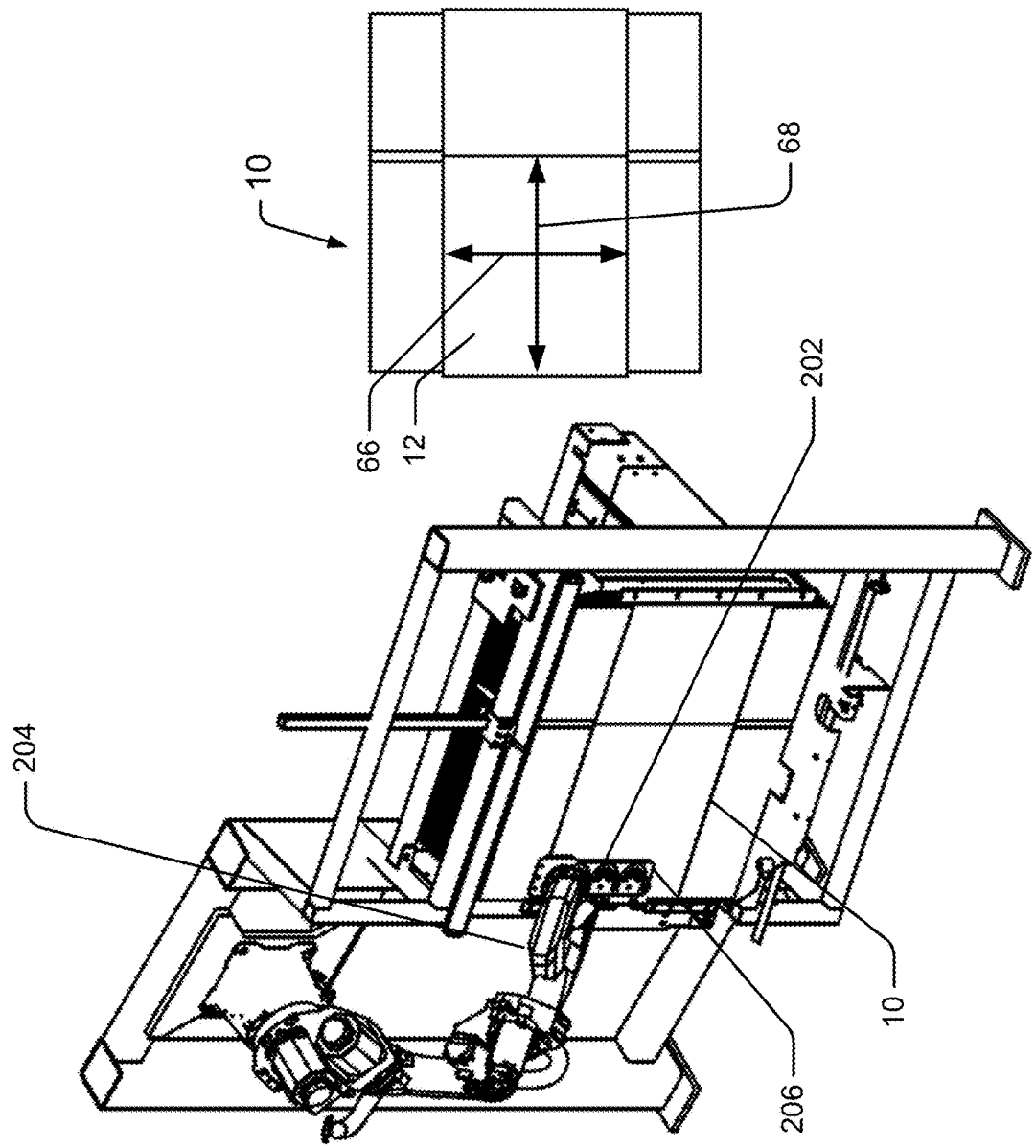

FIG. 2 shows an example system 200 to adjust a pick-off point 202 of a knocked-down case 10, e.g., based at least in part on dimension-information obtained by a system (e.g., system 100 of FIG. 1). The system 200 may be controlled at least in part by the processor 102, memory 104 and/or database 106. The system 200 may include a robotic arm 204, end-of-arm tool 206, which may receive control signals based at least in part on actions of the processor 102, memory 104 and/or specification database 106. The pick-off point 202 is the location of the knocked-down case 10 at which the end-of-arm tool 206 connects to the case. By adjusting the pick-off point, the location at which the case 10 is placed by the robotic arm 204 is also adjusted. Such adjustment may compensate for one or more parts of the case 10 having sizes that are slightly out of specification or out of a range of specifications.

In example operation, the pick-off point 202 may be adjusted based at least in part on dimensions and/or a difference between one or more dimensions of the knocked-down case 10 and dimensions within the specification database 106. Thus, by grasping the case at an appropriate location on the case (e.g., based at least in part on one or more dimensions of the knocked-down case) a particular part of the case 10 may be accurately located at a particular location by the end-of-arm tool 206.

In the example, the major panel 12 of the case 10 may have a height 66 and a width 68. By adjusting the location of the pick-off point 202, a particular part of the case (e.g., the leading or trailing panel) may be controlled. Without the adjustment, if one or both of these dimensions is out-of-specification, then the robotic arm may deliver a part of the case (e.g., the leading minor panel) to the wrong location (e.g., based on an erroneous assumption of the case-length). However, a compensation for a difference in case length (e.g., one-eighth of an inch) could be made by adjusting the pick-off point (e.g., by one-eighth of an inch).

In an alternative, the pickoff-point of the case that is grasped by the end-of-arm tool could be consistent, and the location of the particular part of the case could be controlled by adjustment to movements of the robotic arm 204 and/or end-of-arm tool 206. Both techniques provide means to locate a particular edge, panel or other portion of the case at a particular location and/or orientation, while taking into account slight variations in the size of one or more aspects of the case, in a knocked-down and/or a partially or fully erected configuration.

Figure 3:
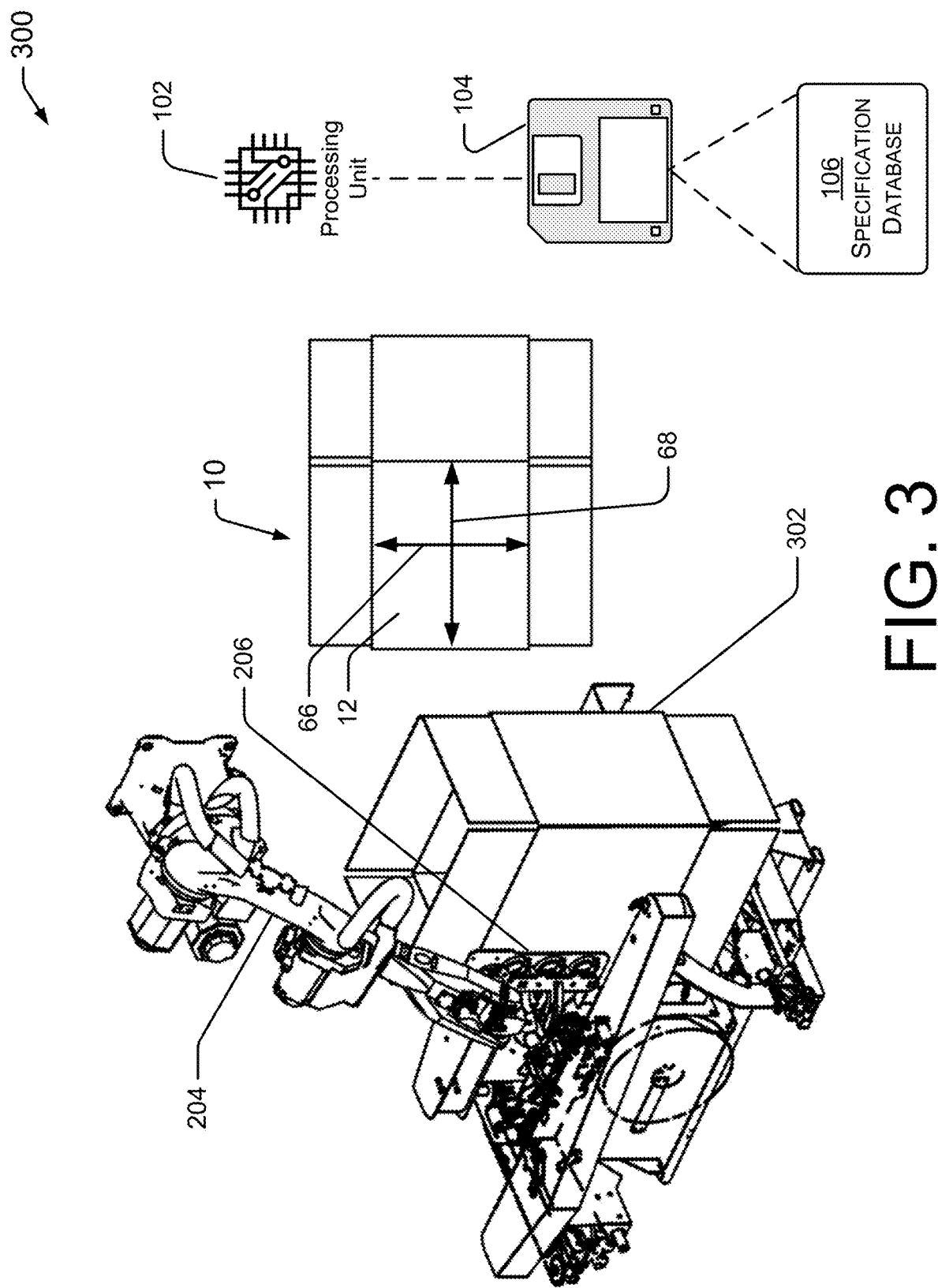
FIG. 3 shows a robotic arm and end-of-arm tool and example operation wherein a location at which a partially erected case is put on a conveyor system or other location is based at least in part on dimensions of the knocked-down case and/or differences between dimensions of the knocked-down case and specifications for the case.

FIG. 3 shows an example system 300 to adjust a location within a conveyor system at which a knocked-down case or partially erected case 10 is placed, e.g., based at least in part on dimension-information obtained by a system (e.g., system 100 of FIG. 1). Accordingly, the case is correctly located (e.g., on the conveyor or other location), based at least in part on dimensions of the case and/or variations of the dimensions of the case from a specification. The system 300 may be controlled at least in part by the processor 102, memory 104 and/or database 106. The system 300 may include a robotic arm 204, end-of-arm tool 206, processor 102, memory 104 and specification database 106. In an example, the system 300 may utilize dimensions 66, 68 from the case in its knocked-down configuration to determine the location for the robotic arm 204 to move the end-of-arm tool 206 so that the case is properly located. While the example system 300 locates a part of the case with respect to a location on a conveyor, similar systems could locate any portion of the case in any location with respect to any item of machinery, product or other object.

By adjusting the location at which the robotic arm places the partially erected case 302, the case may interact with various tools, such as a leading-edge plow, a conveyor assembly, side-belts of a conveyor assembly, or others. Such adjustment may compensate for one or more parts of the case having sizes that are slightly out of specification or out of a range of specifications. In an example, if measurement of a knocked-down case is slightly out-of-specification in the vertical direction, the elevation of that case in a partially erected form may result in more accurate use of a leading-edge minor flap plow. That is, the plow may more accurately contact the leading minor (smaller) flap, thereby folding the flap in preparation for folding the trailing minor flap, the major flaps, and for taping the bottom of the case into a closed configuration.

Figure 4:
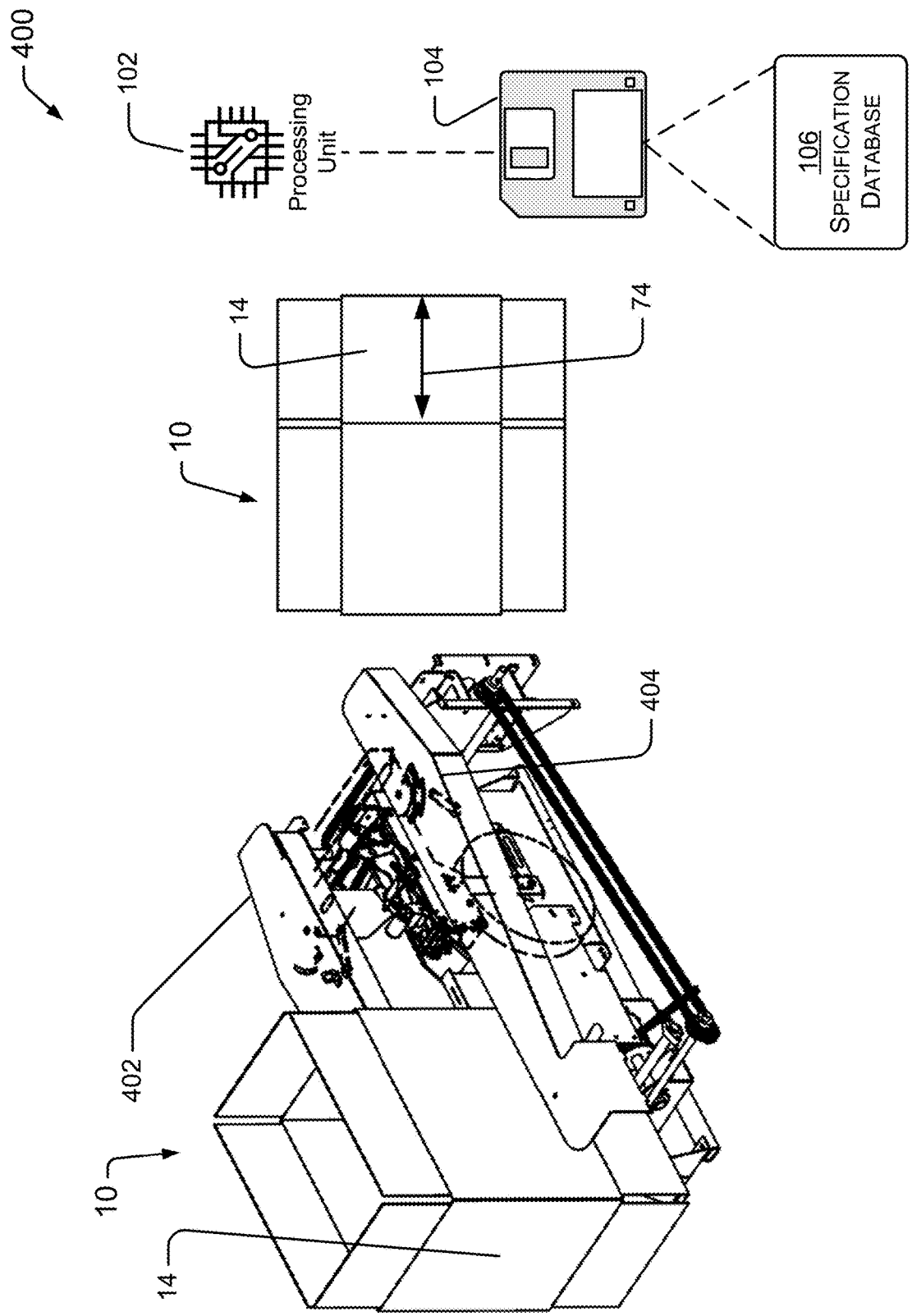
FIG. 4 shows a conveyor system having side belt drives and example operation wherein width between opposed side belt-drives is based at least in part on dimensions of the knocked-down case and/or differences between dimensions of the knocked-down case and specifications for the case.

FIG. 4 shows an example system 400 to adjust a location at which a knocked-down case or partially erected case 10 is placed, e.g., based at least in part on dimension-information obtained by a system (e.g., system 100 of FIG. 1). The system 400 may be controlled at least in part by operation of the processor 102, memory 104 and/or database 106. The example system 400 including a conveyor system having a side belt-drives to advance the case. A distance between the left belt-drive 402 and the right belt-drive 404 may be adjusted to compensate for and/or accommodate a case having a width 74 of minor panel 14 that is slightly wider or narrower than a specification and/or expectation. Thus, the side belt-drives 402, 404 are separated by a width that is tailored for the width of the case 10. The distance between the side-belt drives 402, 404 may be based at least in part on differences between dimensions of the knocked-down case (e.g., the width 74 of the minor panel 70) and specifications for the case. In an example, if the measured difference is outside of the specification, and/or different from a previously handled case, then the distance between the side belt-drives is adjusted.

Figure 5:
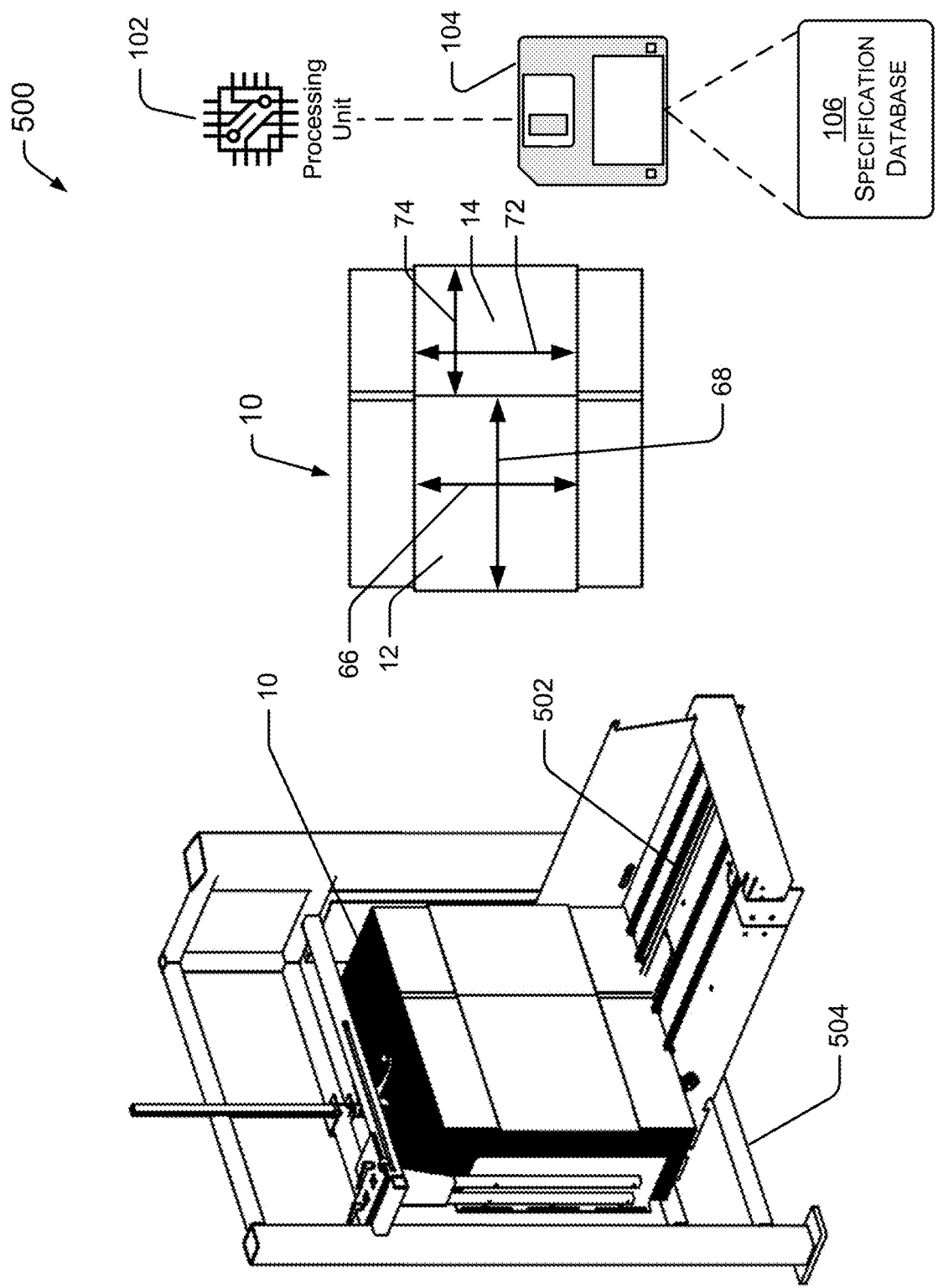
FIG. 5 shows a magazine with a cassette of knocked-down cases and example operation wherein a location of a knocked-down case is adjusted based at least in part on dimensions of the knocked-down case and/or differences between dimensions of the knocked-down case and specifications for the case.

FIG. 5 shows a system 500 to adjust the position of knocked-down cases in a magazine or cassette, e.g., based at least in part on dimension-information obtained by a system (e.g., system 100 of FIG. 1). The system 500 may be controlled at least in part by the processor 102, memory 104 and/or database 106. The system 500 may adjust the position of one or more knocked-down cases 10 in a magazine, cassette, stack, etc. The adjustment may advantageously position a top knocked-down case (on the stack) for pickup by a robotic arm and end-of-arm tool. In an example, the height 66 and width 68 major panel 12 and/or the height 72 and width 74 of the minor panel 14 may be used in the adjustment process. In the example, if one of these dimensions is off, the system 500 may adjust the location of the case 10, so that the robotic arm attaches to the correct spot (the pick-off point) of the case. The adjustment in location may alternatively be performed for any other reason, depending on system design. The adjusted position of the knocked-down case may be based at least in part on differences between dimensions of the knocked-down case and specifications for the case. In the example shown, Y-axis movement along rail 502 and X-axis movement along rail 504 allow the position of the uppermost case to be adjusted, so that a preferred pickoff-point on the case is positioned in a location at which the robotic arm and end-of-arm tool expect and grasp.

In an example, an entire cassette (or stack or bundle) of cases may have been pre-measured, and the dimensions and/or differences between one or more dimensions of each knocked-down case may be copied into memory 106 and read by processor 102. Accordingly, the data-gathering phase of FIG. 1C may be unnecessary.

In an alternative example, the robotic arm and end-of-arm tool may adjust the location to which the tool is moved, based at least in part on the dimensions of a particular case.

The knocked-down case 10 is seen within the cassette and system 500. The case 10 is also shown separately to show detail.

Figure 6:
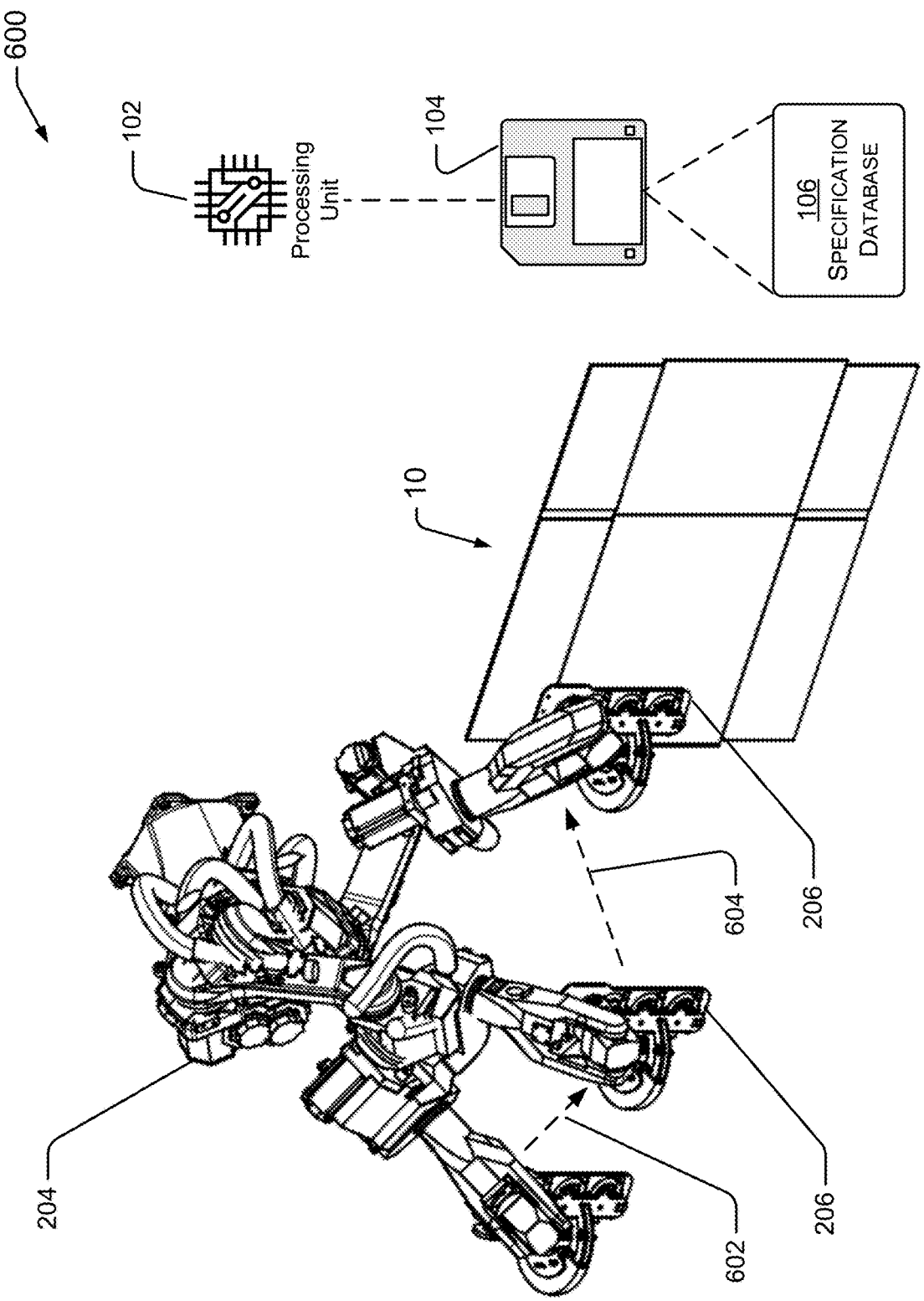
FIG. 6 shows a robotic arm and end-of-arm tool and example operation wherein a path of movement of the arm and tool is based at least in part on dimensions of a knocked-down case and/or differences between dimensions of the knocked-down case and specifications for the case.

FIG. 6 shows a system 600 adapted to make changes to movement of tool(s) based at least in part on dimension-information obtained by a system (e.g., system 100 of FIG. 1). In an example, a robotic arm 204 and end-of-arm tool 206 may move through a different path 602, 604 based in part on a size of a case 10 being processed and/or how the size differs from a specification for the case. The case 10 may be a knocked-down case, a partially erected case, or a fully erected case. The case may or may not be packed with product. In the example shown, the system 600 includes a robotic arm 204 and end-of-arm tool 206. The movement 602, 604 of the robotic arm 204 and end-of-arm tool 206 is based at least in part on obtained dimensions (measured dimensions or dimensional information read from a source) of the knocked-down case, and/or specifications for the case, and/or differences between the obtained dimensions and specified dimensions. The data including actual case dimensions and specified case dimensions may be included in the memory 104 and/or specification database 106. The system 600 may be controlled at least in part by the processor 102, memory 104 and/or database 106.

Figure 7:
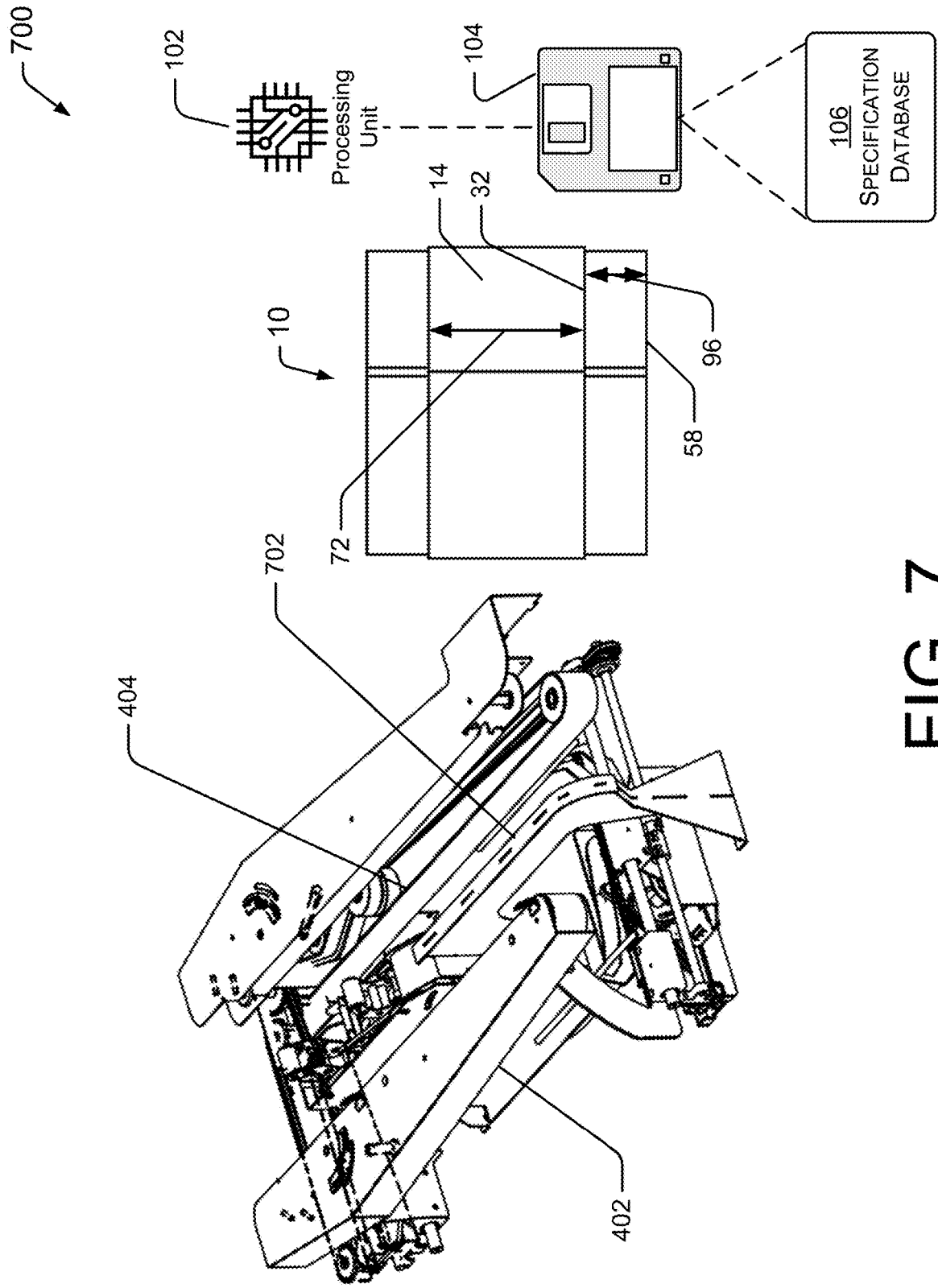
FIG. 7 shows a leading minor flap plow and example operation wherein an elevation of the plow is adjusted based at least in part on dimensions of a knocked-down case and/or differences between dimensions of the knocked-down case and specifications for the case.

FIG. 7 shows a system 700 adapted to make changes to movement of a leading flap 58 closing tool based at least in part on dimension-information obtained by a system (e.g., system 100 of FIG. 1). The system 700 may include a leading minor flap plow 702 operated to adjust an elevation of the plow based at least in part on differences between dimensions of a partially erected case and specifications for the case. In an example, an elevation of a leading minor flap plow 702 is based in part on a size of a case being processed.

FIG. 7 also shows a knocked-down case 10, which is shown separately from the plow 702 to avoid obscuring the plow. A measurement 96 of a minor panel 58 may be used to determine, at least in part, an elevation of the leading minor flap plow 702. FIG. 7 also shows left and right drive-belts 402, 404 of a conveyor system, and a tape head. The system 700 may be controlled at least in part by the processor 102, memory 104 and/or database 106.

The case may be a partially erected case, and the leading flap plow 702 may be configured to contact and to close a leading minor flap by bending it along a score line 32. In the example shown, the system 700 adjusts the elevation of the plow 702. The adjustment may be based at least in part by a height 72 of the leading minor panel 14. In the example, if the leading minor panel 14 is slightly larger/smaller than a specification for the case, then the plow 702 may be lowered/raised slightly, to more correctly position the plow for contact with the leading minor flap 14. Alternatively or additionally, the height 96 of the minor flap 58 may be utilized. Alternatively or additionally, the height of leading minor flap plow 702 based on a previous case that was plowed may be considered. Data including actual case dimensions and specified case dimensions may be included in the memory 104 and/or specification database 106. The system 700 may be controlled at least in part by the processor 102, memory 104 and/or database 104.

Figure 8:
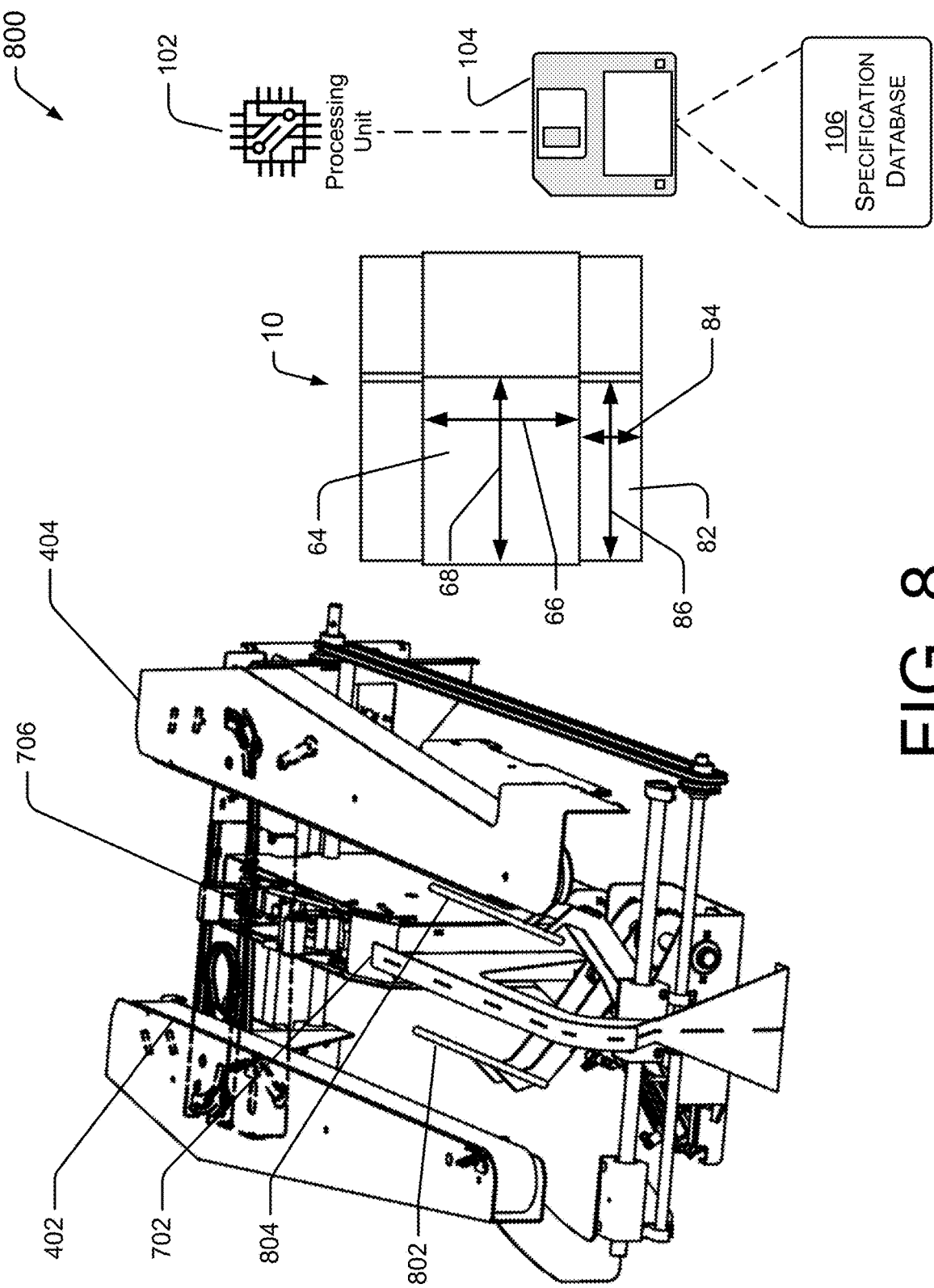
FIG. 8 shows a major flap plow and example operation wherein operating parameters of the plow are adjusted based at least in part on dimensions of a knocked-down case and/or differences between dimensions of the knocked-down case and specifications for the case.

FIG. 8 shows a system 800 adapted to make changes to operation of a major-flap closing tool, e.g., based at least in part on dimension-information obtained by a system (e.g., system 100 of FIG. 1). The system 800 may include a major flap plow (e.g., with two "jaws" 802, 804 or "side-kickers") and example operation wherein operating parameters of the plow are adjusted based at least in part on dimensions of a case and/or differences between actual dimensions of a case to be closed and intended dimensions in a specification for the case and/or a location of the side-kickers after operations on a previous case.

FIG. 8 also shows a knocked-down case 10, which is shown separately from the major flap kickers 802, 804 to avoid obscuring the plow. FIG. 8 also shows left and right drive-belts 402, 404 of a conveyor system, and a tape head. The system 800 may be controlled at least in part by the processor 102, memory 104 and/or database 106.

The case may be a partially erected case, and the major flap kickers 802, 804 may be configured to contact and to close the pair of lower major flaps by bending each along its respective score line. In the example shown, the system 800 may make one or more adjustments to the operation of the major flap plow. The adjustments may be based the height 66 and/or width 68 of one or both of the major panels 12, 64, and based on the height 84 and/or width 86 of one or both major flaps 22, 82. The adjustments may be based at least in part on differences between these measurements and specified measurements and/or ranges of measurements. The adjustments may be based at least in part on a location of the major flap kickers resulting from prior use.

In a first example, the system 800 may adjust the elevation of the plow 802, 804. In a second example, the system 800 may adjust a degree to which jaws 802, 804 of the plow are opened. In a third example, the system 800 may adjust timing of when the jaws are closed. In a fourth example, the system 800 may adjust a degree to which the plow is positioned upstream or downstream within the conveyor flow. One or more of the adjustments may be performed, based on design parameters and the ability and/or need to make such adjustments. Data including actual case dimensions and specified case dimensions may be included in the memory 104 and/or specification database 106.

Figure 9:
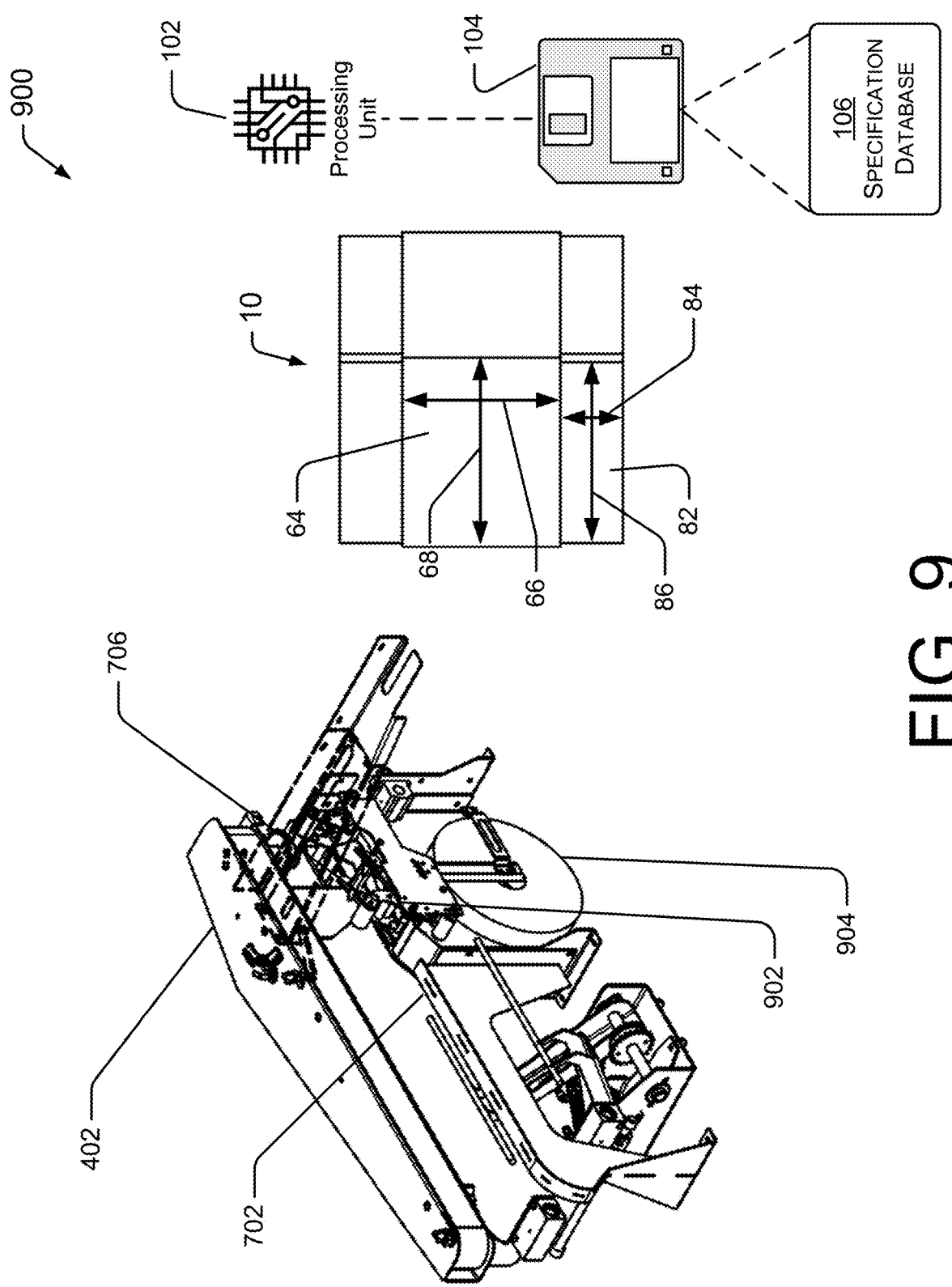
FIG. 9 shows a tape head and example operation wherein an elevation or other parameters of the tape head are adjusted based at least in part on dimensions of a knocked-down case and/or differences between dimensions of the knocked-down case and specifications for the case.

FIG. 9 shows a system 900 adapted to make changes to operation of a tape head (tape application tool) based at least in part on information obtained by a system (e.g., system 100 of FIG. 1) that obtains dimensional information. The system 900 may include a tape head 902 and tape roll 904. In example operation, operating parameters of the tape head are adjusted based at least in part on dimensions of a case and/or differences between actual dimensions of a case to be closed and intended dimensions in a specification for the case and/or a previous location of the tape head due to operations on a previous case.

FIG. 9 also shows a knocked-down case 10, which is shown separately from the tape head 902, 904 to avoid obscuring the tape head. FIG. 9 also shows left drive-belt 402 of a conveyor system. The system 900 may be controlled at least in part by the processor 102, memory 104 and/or database 106.

The case may be a partially erected case, and the tape head 902 may be configured to contact and to seal the pair of lower major flaps by applying tape to both major flaps. In the example shown, the system 900 may adjustments to the operation of the tape head. The adjustments may be based the height 66 and/or width 68 of one or both of the major panels 12, 64, and based on the height 84 and/or width 86 of one or both major flaps 22, 82. The adjustments may be based at least in part on differences between these measurements and specified measurements and/or ranges of measurements. The adjustments may be based at least in part on a location of the tape head resulting from prior use.

In a first example, the system 900 may adjust the elevation of the tape head 902, and optionally the tape spool 904. In a second example, the system 900 may adjust a timing of tape application. In a third example, the system 900 may adjust timing of tape cutting. In a fourth example, the system 900 may adjust a timing of contact with a leading minor panel and timing of kicking tape onto a trailing minor panel. One or more of the adjustments may be performed, based on design parameters and the ability and/or need to make such adjustments. Data including actual case dimensions and specified case dimensions may be included in the memory 104 and/or specification database 106.

Figure 10:
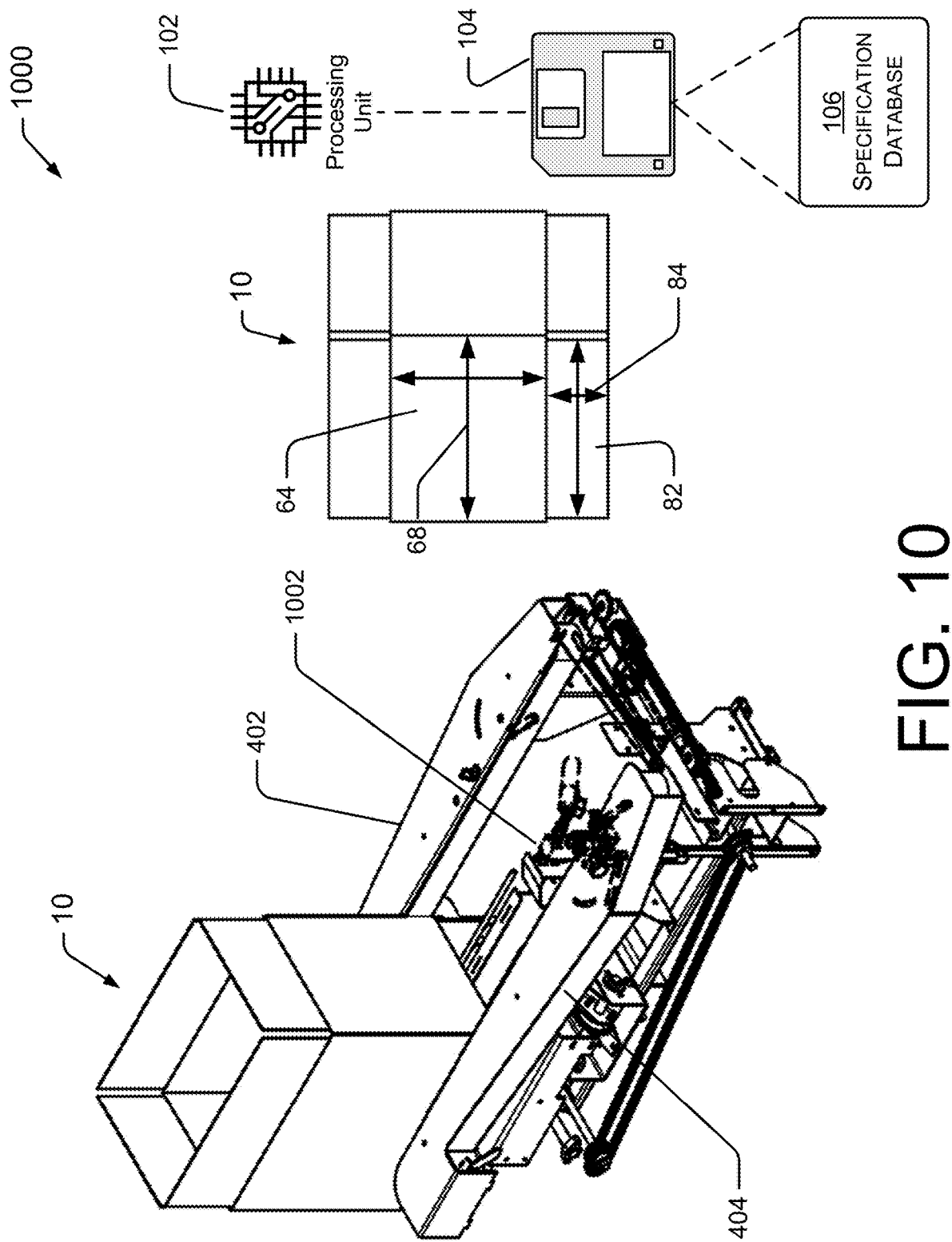
FIG. 10 shows a glue head or glue gun and example operation wherein an elevation or other parameters of the glue head are adjusted based at least in part on dimensions of a knocked-down case and/or differences between dimensions of the knocked-down case and specifications for the case.

FIG. 10 shows a system 1000 adapted to make changes to operation of a glue head (glue application tool) based at least in part on information obtained by a system (e.g., system 100 of FIG. 1) that obtains dimensional information. The system 1000 may include a glue head 1002. In example operation, operating parameters of the glue head are adjusted based at least in part on dimensions of a case and/or differences between actual dimensions of a case to be closed and intended dimensions in a specification for the case and/or a previous location of the glue head due to operations on a previous case.

FIG. 10 also shows a knocked-down case 10, which is shown separately from the tape head 1002 to avoid obscuring the glue head. FIG. 10 also shows left and right drive-belt 402, 404 of a conveyor system. The system 1000 may be controlled at least in part by the processor 102, memory 104 and/or database 106.

The case may be a partially erected case, and the glue head 1002 may be configured to contact and to seal the pair of lower major flaps by applying glue to at least one major flap. In the example shown, the system 1000 may adjustments to the operation of the glue head. The adjustments may be based the height 66 and/or width 68 of one or both of the major panels 12, 64, and based on the height 84 and/or width 86 of one or both major flaps 22, 82. The adjustments may be based at least in part on differences between these measurements and specified measurements and/or ranges of measurements. The adjustments may be based at least in part on a location of the glue head resulting from prior use.

In a first example, the system 1000 may adjust the elevation of the glue head 902. In a second example, the system 1000 may adjust a timing of glue application. In a third example, the system 1000 may adjust timing of pressure applied to areas of glue application. One or more of the adjustments may be performed, based on design parameters and the ability and/or need to make such adjustments. Data including actual case dimensions and specified case dimensions may be included in the memory 104 and/or specification database 106.

Figure 11:
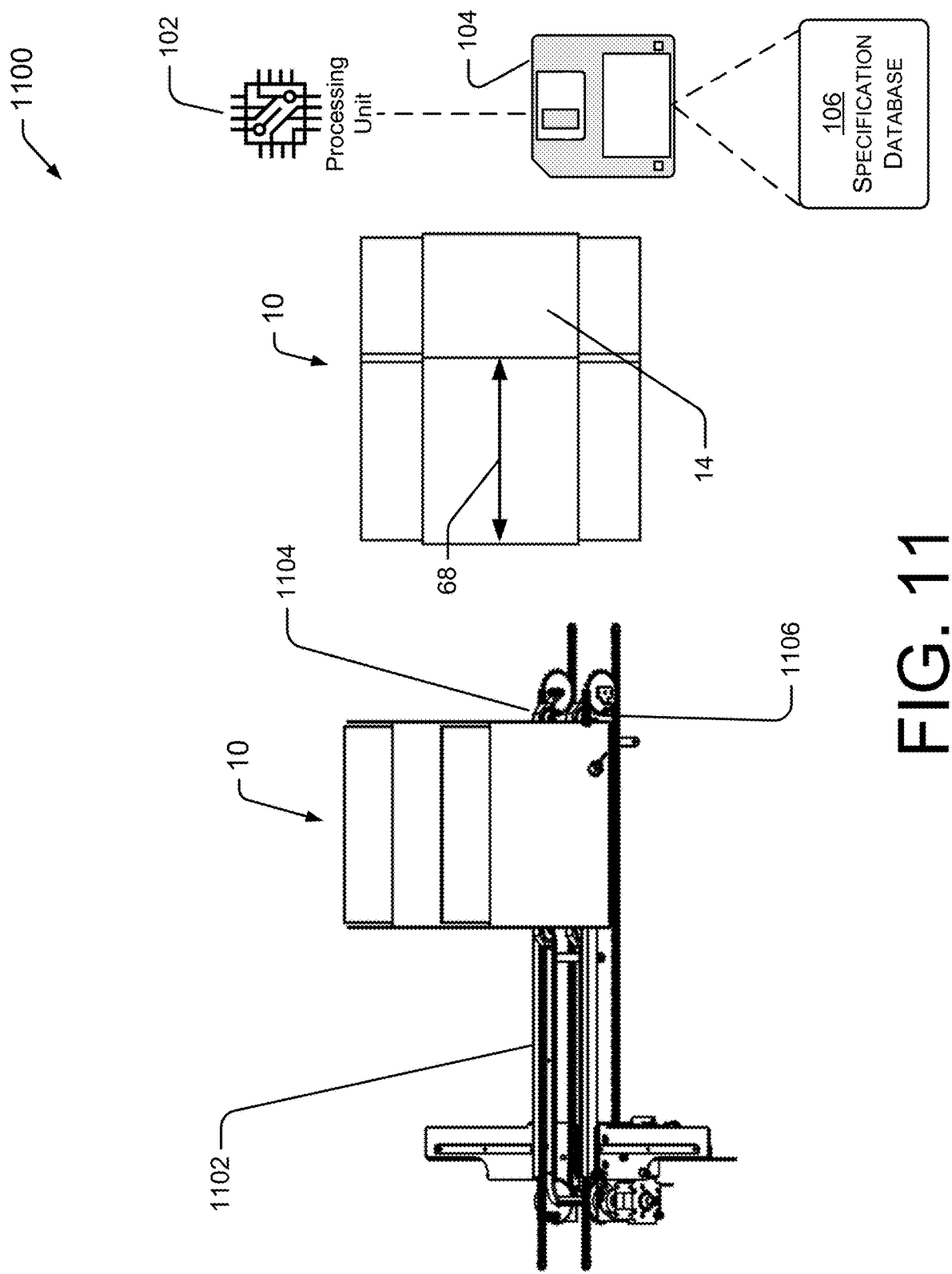
FIG. 11 a conveyor with flight lugs and example operation wherein a position or other parameters of one or more flight lugs are adjusted based at least in part on dimensions of a knocked-down case and/or differences between dimensions of the knocked-down case and specifications for the case.

FIG. 11 shows a system 1100 adapted to make changes to operation of a conveyor assembly, e.g., based at least in part on information obtained by a system (e.g., system 100 of FIG. 1) that obtains dimensional information. The system 1100 may include a conveyor 1102 and control system(s) to adjust conveyor operation and flight lug location based at least in part on: dimensions of a case to be handled; differences between actual dimensions of a case to be handled and intended dimensions (e.g., in a specification for the case); and/or locations of the flight lug(s) after handling a previous case. Based on such data, the system 1100 may control conveyor start times, stop times, speed, and locations of flight lugs 1104, 1106 of the conveyor assembly (e.g., flight lugs designed to push cases along the conveyor assembly). In an example, a slight difference in case length (e.g., major panel length 68) may indicate a slight difference in the timing, speed and/or location at a given time of the flight lugs 1104, 1106, which contact and push the trailing minor panel 14 of the case.

FIG. 11 also shows a knocked-down case 10, which is shown separately from the conveyor assembly 1102 to indicate possible measurements input to the system 1100. In an example, a measurement of a length 68 of a major panel of a case may be used to determine, at least in part, locations and movement of flight lugs on a conveyor assembly. In an example, the system 1100 may be controlled at least in part by the processor 102, memory 104 and/or database 106.

Figure 12:
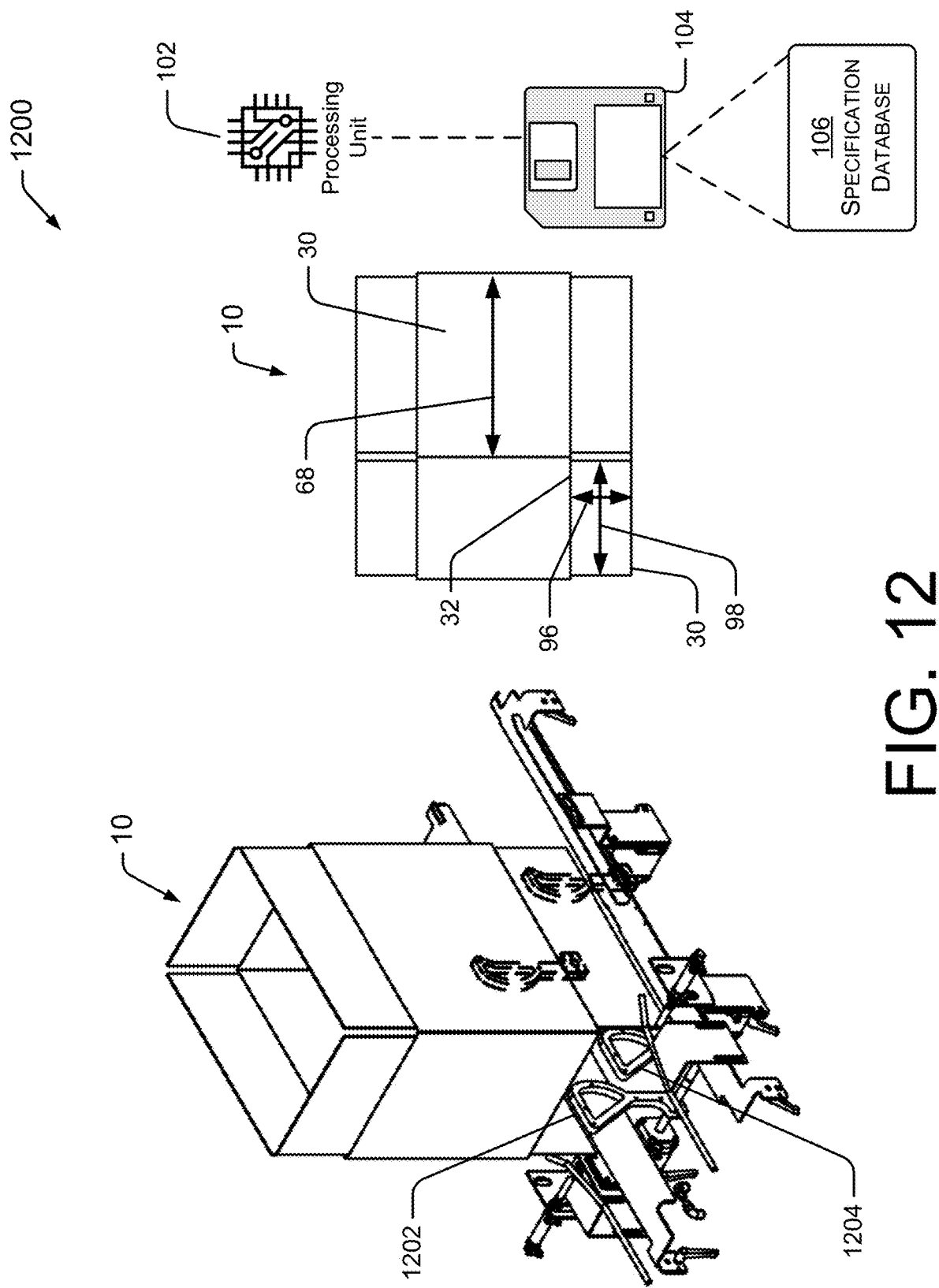
FIG. 12 shows a trailing minor flap plow and example operation wherein operating parameter(s) of the plow are adjusted based at least in part on dimensions of a knocked-down case and/or differences between dimensions of the knocked-down case and specifications for the case.

FIG. 12 shows a system 1200 including a trailing minor flap kicker(s) and example operation wherein operating parameters of the kicker(s) are adjusted, based at least in part on dimension-information obtained by a system (e.g., system 100 of FIG. 1). After the leading minor flap is folded, the two major flaps are folded, and then the trailing minor flap is folded, typically by one or more "flap kickers" 1202, 1204. In examples, the location of the kicker(s), timing of the "kick" of the minor flap that folds that flap along its score line 32 adjacent the trailing minor panel 30, and/or separation of two or more kickers 1202, 1204 is controlled by programming and/or control systems based at least in part on dimensions and/or difference(s) of dimension(s) from preferred dimension(s) and/or ranges of dimension(s). In an example, a distance between two kickers 1202, 1204, and a distance between each kicker and an adjacent edge of the trailing minor flap 30, may be adjusted based at least in part on a width 98 of the trailing minor flap 30. In a further example, timing of the kick may be based at least in part on the height 96 of the trailing minor flap 30 and/or the length 68 of a major panel 30. The longer these dimensions are, the more the time of the kick can be delayed, so that the kick strikes the trailing minor flap at a location that results in a better fold at the score/fold line 32. Data including actual case dimensions and specified case dimensions may be included in the memory 104 and/or specification database 106. In an example, the kickers 1202, 1204 may be rotated on an axle. As the case 10 moves over the kickers, the kickers may be rotated to a location below a level of the case. However, as the case begins to pass the kickers, the kickers may be rotated to "kick" the trailing minor flap 30, and to thereby bend the trialing minor flap along the score 32.

Figure 13:
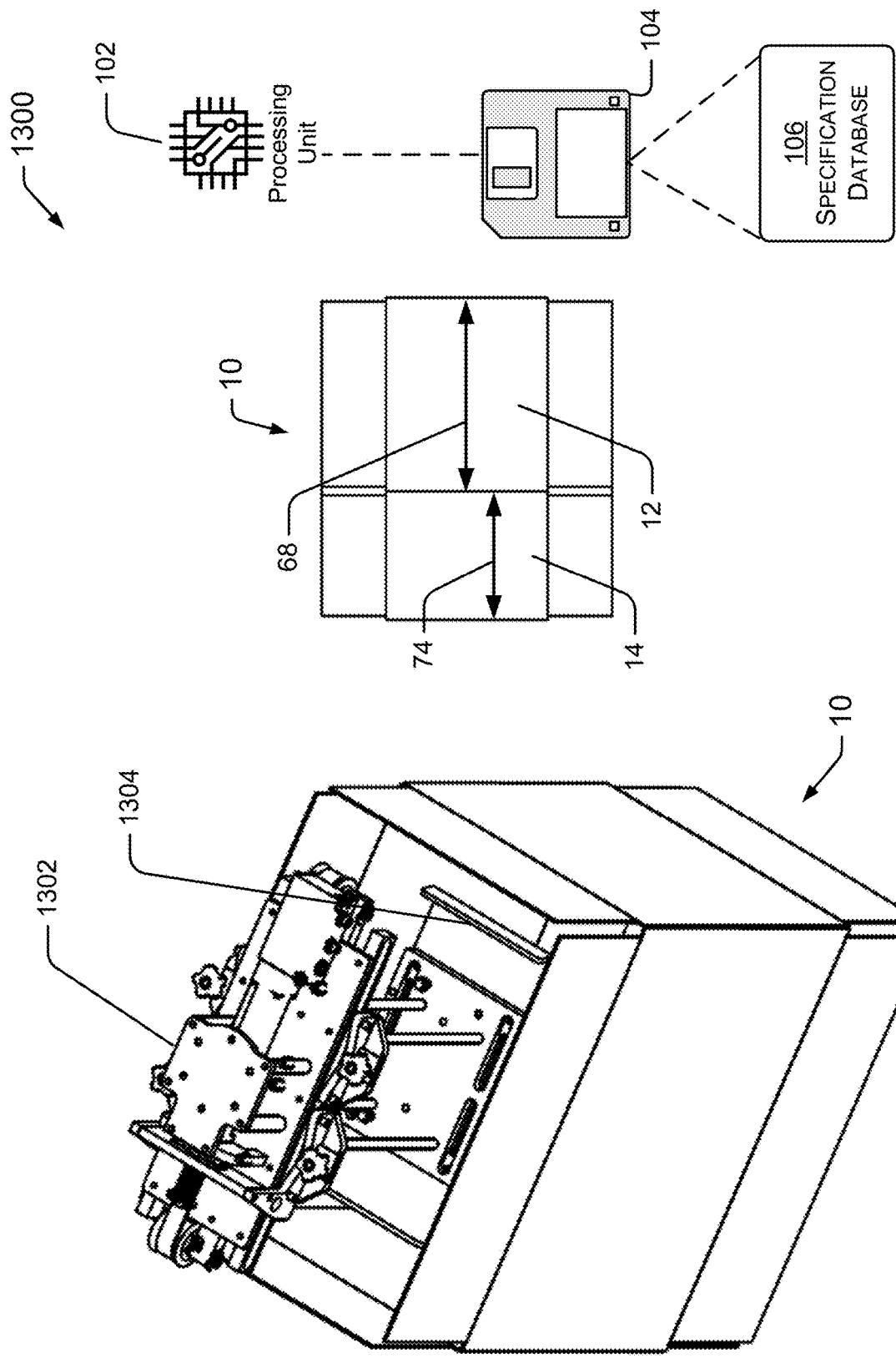
FIG. 13 shows a glue mandrel and example operation wherein operating parameters of the mandrel are adjusted based at least in part on dimensions of a knocked-down case and/or differences between dimensions of the knocked-down case and specifications for the case.

FIG. 13 shows a system 1300 including glue mandrel (e.g., to glue lower flaps of a case. In example operation, the system 1300 may adjust operating programming, data and/or variables used to control the mandrel, based at least in part on dimension-information obtained by a system (e.g., system 100 of FIG. 1).

FIG. 13 shows structure and operation of a mandrel, which can be adjusted to fit a size of the bottom of a partially erected case, to hold major and minor lower flaps in position, and to glue the flaps closed. The operation of the mandrel may be controlled by programming and/or control systems based at least in part on: dimensions of the case; and/or difference(s) of dimension(s) from preferred dimension(s) and/or ranges of dimension(s); and/or a previous configuration of the mandrel. Data including actual case dimensions, specified case dimensions/ranges, and/or differences between such dimensions may be included in the memory 104 and/or specification database 106.

The system 1300 may include a glue mandrel 1302 having a base 1304 that is adjustable in size (e.g., having an adjustable footprint). The adjustability allows for correction of slight differences in the dimensions of the case, caused by slight imperfections in the size of the major panels and/or minor panels of the case.

In example operation, the glue mandrel 1302 is lowered into a partially erected case. The base 1304 of the glue mandrel is adjusted in size not to the specified size of the case, but to the actual measured size of the case. In the example shown, the measured length 74 of the minor panel 14 (i.e., the width of the case 10 and the measured length 68 of the major panel 12, can be used to determine a size to which to adjust the base 1304 of the mandrel 1302. Accordingly, the measurements 68 and/or 74 allow adjustment of the base 1304 to better fit the actual case, and not a case specification. In an example, the system 1300 may be controlled at least in part by the processor 102, memory 104 and/or database 106, which may include at least the measurements 68 and 74.

Figure 14:
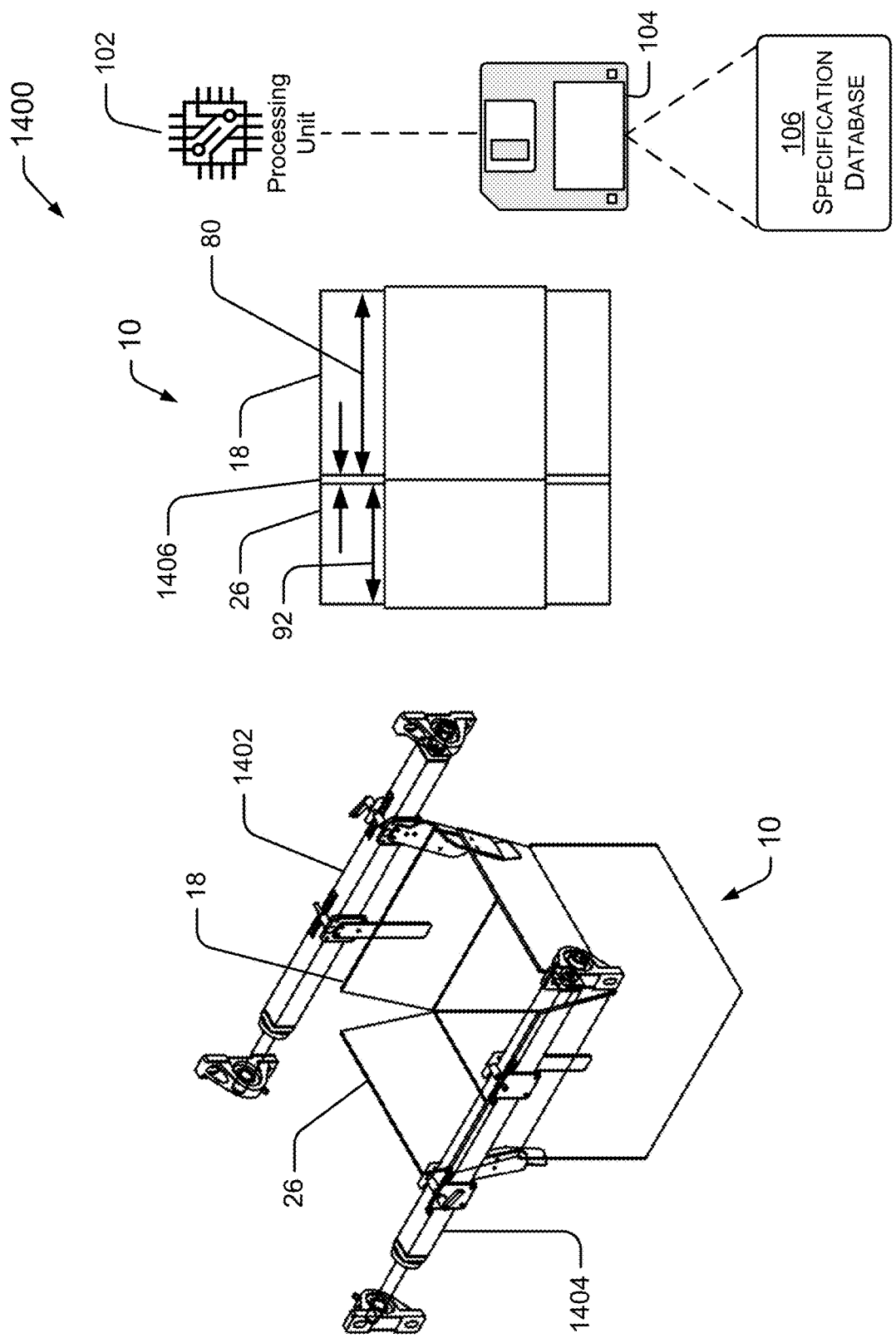
FIG. 14 shows flap spreaders and example operation wherein operating parameter(s) of the spreaders are adjusted based at least in part on dimensions of a knocked-down case and/or differences between dimensions of the knocked-down case and specifications for the case.

FIG. 14 shows structure and operation of a flap spreader assembly 1400, which can be operated to hold the major flaps of a case so that one or more of the leading minor flap and the trailing minor flap may be folded into a closed position or orientation. Accordingly, the flap spreader assembly prevents unwanted contact between flaps, particularly by holding the major (larger) flaps while one or more minor flaps is closed. The operation of the flap spreader assembly 1400 may be controlled by a processor 102, programming, and/or control systems based at least in part on dimensions and/or difference(s) of dimension(s) from preferred dimension(s) and/or ranges of dimension(s). Programming and data including actual case dimensions, specified case dimensions/ranges, and/or differences between such dimensions may be included in the memory 104 and/or specification database 106.

The flap spreader assembly or system 1400 may operate in a manner based at least in part on dimension-information obtained by a system (e.g., system 100 of FIG. 1). In the example shown, flap spreaders 1402 and 1404 hold the major flaps open so that the minor flaps can be closed. In an example, if a notch 1406 between a minor flap 26 and a major flap 18 is too small, there may be contention, rubbing and/or binding between the minor flap(s) and the adjacent major flap(s) when the minor flaps are folded along their score lines in a flap-closing process. Because the flap spreading assembly 1400 is able to hold the major flaps open, other assemblies are able to close the minor flaps. In example operation, the system 1400 may be controlled at least in part by the processor 102, memory 104 and/or database 106, which may include measurements 1406, 80, 92 and/or other measurements.

One or more operating parameters of the assembly 1400 may be adjusted based at least in part on differences between dimensions of a partially erected case and specifications for the case. In an example, if the gap 1406 between adjacent flaps is too small, the flap spreader assembly 1400 may be utilized. If the gap is appropriately sized or within a range, the flap spreader assembly 1400 may not be used. Thus, the system 1400 may utilize programming, data and/or variables to control the flap spreader(s) 1402, 1404 based at least in part on obtained dimensional information.

Figure 15:
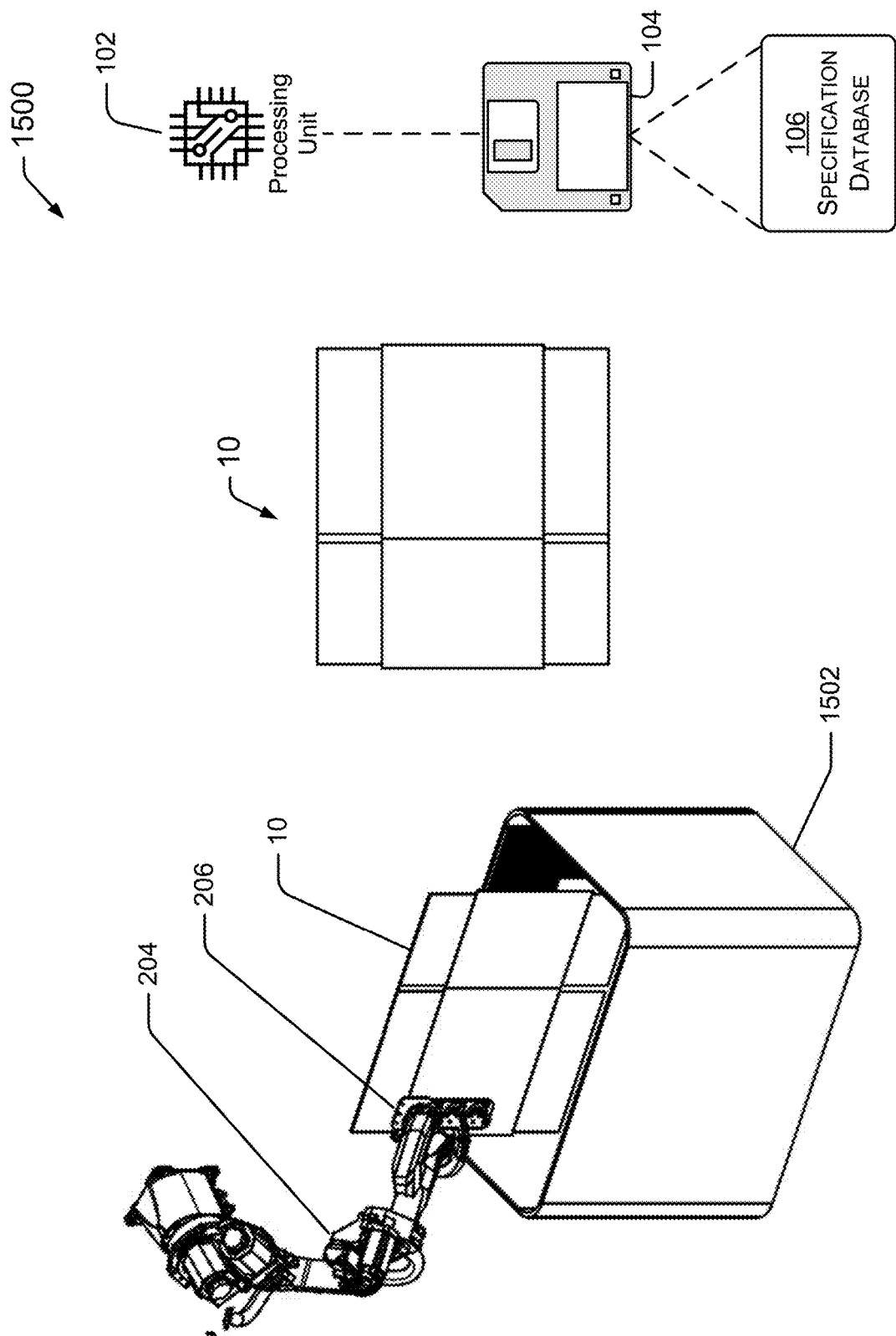
FIG. 15 shows a robotic arm and end-of-arm tool and example operation wherein a knocked-down case is rejected based at least in part on dimensions of a knocked-down case and/or differences between dimensions of the knocked-down case and specifications for the case.

FIG. 15 shows a system 1500 including a decision process and associated mechanical apparatus for distinguishing and separating knocked-down cases that can, and cannot, be assembled into erected cases within a specification. The system 1500 may operate based at least in part on dimension-information obtained by a system (e.g., system 100 of FIG. 1). In the example shown, the processor 102, software defined in a memory unit (represented by generic memory icon 104) and a specification database 106 execute an algorithm that distinguishes knocked-down cases that can or cannot be assembled to within the specification. In the example shown, a robotic arm 204 and end-of-arm tool 206 are shown rejecting a case 10 based on out-of-specification characteristics that cannot be resolved by application of one or more of the techniques described in association with FIGS. 1-14.

Example Methods

Figure 16:
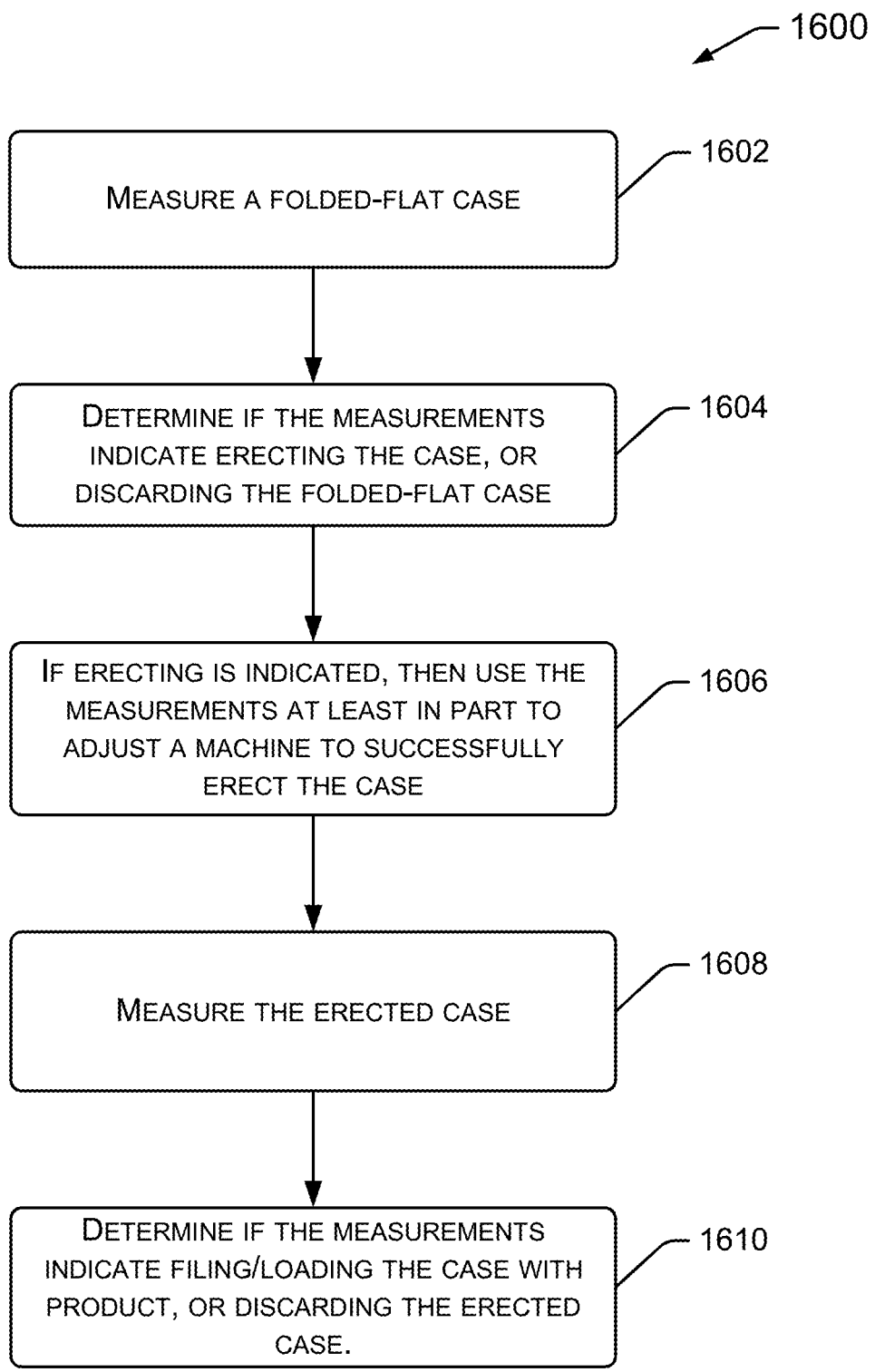
FIG. 16 is a flowchart showing a method and example operation of a system configured to measure, and/or obtain measurement data of, a case while in a folded-flat configuration and erect the case based in part on the measurements.

FIG. 16 shows a method 1600 and example operation of a system configured to measure a case while in a folded-flat configuration and erect the case based in part on the measurements.

At block 1602, a folded-flat case is measured.

At block 1604, determining if the measurements indicate erecting the case, or discarding the folded-flat case.

At block 1606, if erecting is indicated, then using the measurements at least in part to adjust a machine to successfully erect the case.

At block 1608, measuring the erected case.

At block 1610, determining if the measurements indicate filing/loading the case with product, or discarding the erected case.

Figure 17:
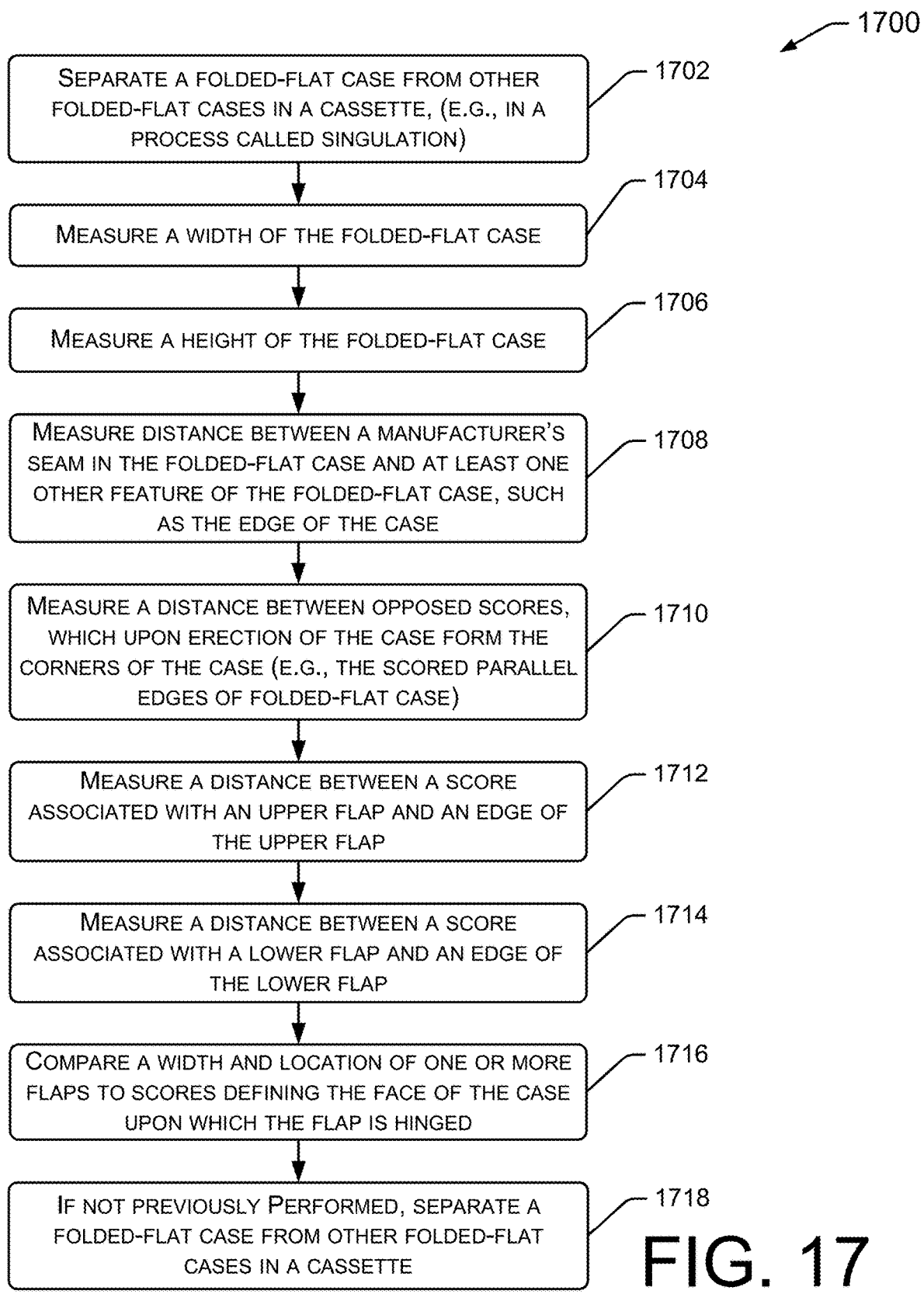
FIG. 17 is a flowchart showing a method and example operation of a system configured to measure, and/or obtain measurement data of, a case while in a folded-flat configuration and erect the case based in part on the measurements.

FIG. 17 shows a method 1700 and example operation of a system configured to measure a case or carton while in a folded-flat configuration.

At block 1702, a folded-flat case is separated from other folded-flat cases in a cassette, in a process called singulation. Either before or after singulation, dimensions of the folded-flat case are measured. Accordingly, block 1702 may be performed before or after any of the blocks 1704 through 1716. Accordingly, the separation is also shown at block 1718. In an example, if the measuring processes are performed by a cassette or other knocked-down case containing or managing system, then the separation may happen at block 1718. The dimensions may be measured by operation of one or more sensors, cameras, lasers, mechanical detectors, and/or other tools. Such tools may be part of a cassette or magazine (e.g., 110 of FIG. 1C). The dimensions that may be measured may include (but are not limited to) distances between one or more of: edges of the cardboard, scores in the cardboard, and/or a manufacturer's seam along which the cardboard has been glued. The manufacturer's seam may include an outside manufacturer's seam where the cardboard edge is on top of the cardboard to which it is glued.

At block 1704, a width of the folded-flat case is measured. In an example, a distance between opposed folded corners (i.e., the parallel edges of folded-flat case) may be measured.

At block 1706, a height of the folded-flat case is measured. In an example, a distance between an edge of an upper flap to an edge of a lower flap may be measured.

At block 1708, a distance between a manufacturer's seam in the folded-flat case and at least one other feature of the folded-flat case, such as the edge of the case, may be measured.

At block 1710, a distance between opposed scores, which upon erection of the case form the corners of the case (i.e., the scored parallel edges of folded-flat case) may be measured.

At block 1712, a distance between a score associated with an upper flap and an edge of the upper flap may be measured.

At block 1714, a distance between a score associated with a lower flap and an edge of the lower flap may be measured.

At block 1716, a width and location of one or more flaps may be compared to scores defining the face of the case upon which the flap is hinged. The flaps may be a prescribed width that is narrower than the distance between scores (to allow the flaps to be folded). An edge of each flap must be inset from each score by a distance that allows the flap to be folded. The flaps include four upper flaps (two major flaps and two minor flaps) and four lower flaps (two major flaps and two minor flaps). In the circumstance of a case having a square footprint, the distinction between upper and lower flaps may be based on orientation of the case, with the first-closed flaps being the "minor flaps."

In some examples, the following measurements are used:

Manufacturer's seam location. The seam, which may be include two edges of cardboard that are glued together, may have been fastened in a manner that differs from specifications.

Manufacturer's seam straightness may require measurement and may be outside of tolerances.

The manufacture's seam should ensure that the top and bottom are parallel (at least within tolerances) where they meet.

Figure 18:
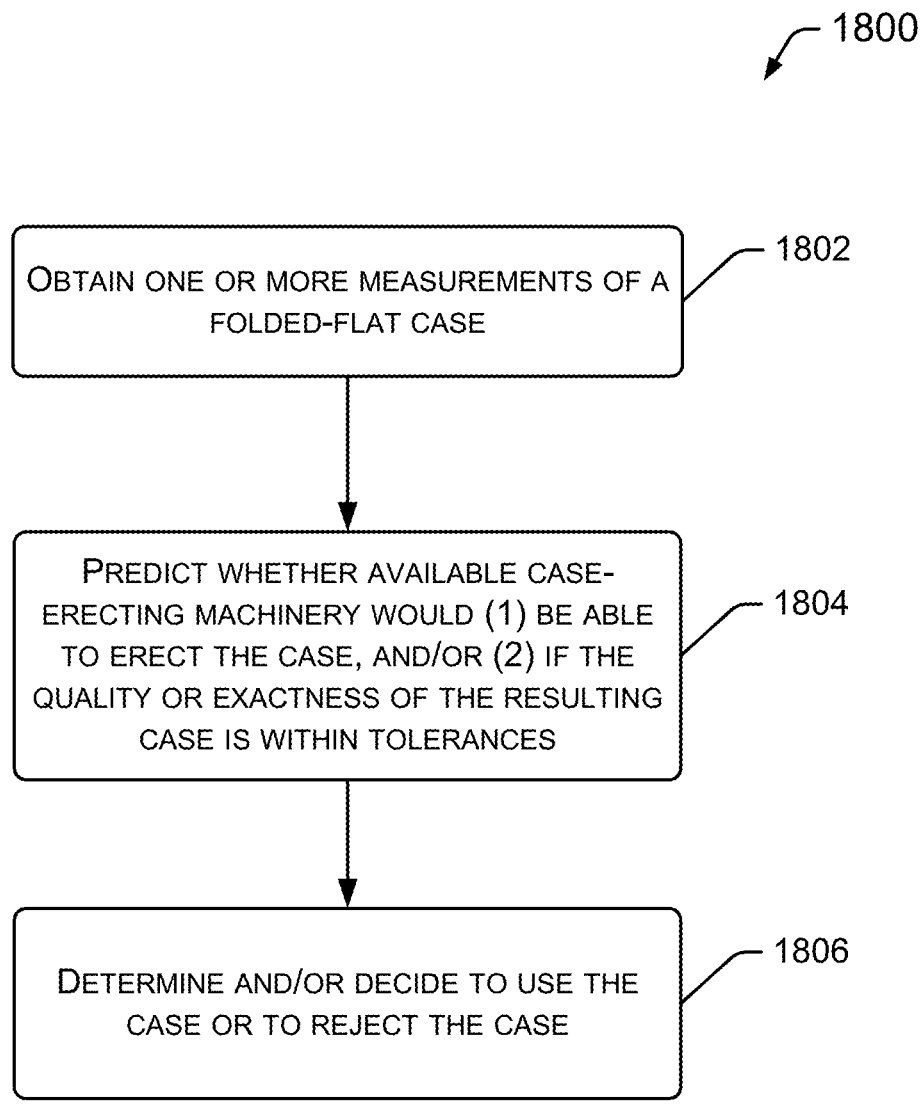
FIG. 18 is a flowchart showing a method and example operation of a system configured to measure, and/or obtain measurement data of, a case while in a folded-flat configuration and erect the case based in part on the measurements.

FIG. 18 shows a method 1800 and example operation of a system configured to determine if measurements of a folded-flat case are sufficiently within tolerances, or if the case must be discarded. Individual measurements may be considered, as well as combinations of measurements, which may cause problems collectively.

At block 1802, one or more measurements of a folded-flat case are obtained.

At block 1804, a predication is made about whether available case-erecting machinery would (1) be able to erect the case, and/or (2) if the quality or exactness of the resulting case is within tolerances. The predication(s) may be based on one or more of the measurements made, as well as any other information, such as a range of acceptable final assembled case dimensions. The prediction(s) may be somewhat simple, such as if one measurement is out of tolerances, the prediction is for failure. The prediction may be somewhat more complex, in that several measurements, none of which alone is enough to predict failure for the case, may collectively be enough to predict failure for the case.

In an example, one or more of the following measurements may be made. The measurements may be used individually and/or collectively to determine if a knockdown case dimensions were within a threshold difference-value (positive or negative) of established and/or specified values.

Height
Width
Lower score line distance from upper edge
Upper score line distance from upper edge
Distance between score line
Manufacturer's seam straightness
Manufacturer's seam distance from each edge
Manufacturer's seam alignment
Width of each flap
Height of each flap If any of the following conditions are met, the knockdown case would be rejected.

Manufacturer's seam is more than a pre-set amount out of straightness tolerance.
Manufacturer's seam location is more than a pre-set amount out of tolerance.
Manufacturer's seam miss-aligns the top and bottom of the case.
Score line is not parallel with the edges by more than a pre-set percent.
Flap width equals or exceeds side of case dimension
Flap height is more than half height of side At block 1806, a determination is made to use the case or to reject the case. The determination may be based on a predicted outcome of the nature and precision of the erected case, which was made at block 204. The determination may also be based on a degree to which compensation for unfavorable measurements is expected to succeed. In some situations, a sloppy case may be more accepted than other situations. For example, if bagged food is to be loaded into the case, the bags may push on the sides and make the case look uneven even if it was erected with precision. In such circumstances, it may be a low-quality case may be acceptable. However, if jars of food are to be loaded into the case, a higher precision may be required. We can set the decision to use/not-use at block 206.

Figure 19:
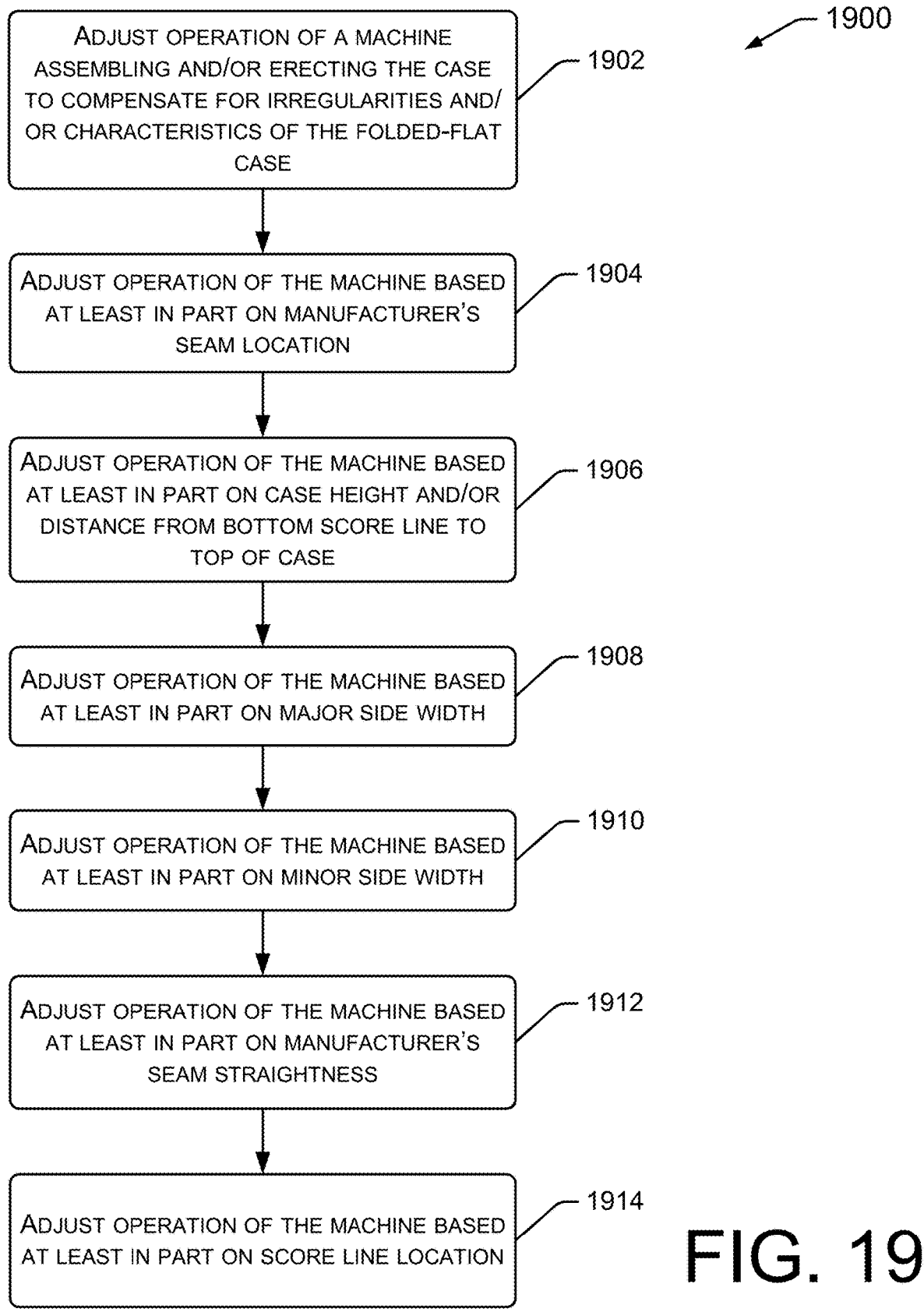
FIG. 19 is a flowchart showing a method and example operation of a system configured to measure, and/or obtain measurement data of, a case while in a folded-flat configuration and erect the case based in part on the measurements.

FIG. 19 shows a method and example operation 1900 of a system configured to assemble the case based in part on information obtained from measuring the case while in a folded-flat configuration.

At block 1902, adjustments may be made to the operation of a machine assembling and/or erecting the case to compensate for irregularities and/or characteristics of the folded-flat case. The adjustments may anticipate problems with the case-erection process and overcome those problems. The adjustments may be made in anticipation problems that would otherwise plague the case-erection outcome, and thereby result in a better outcome.

In an example, cases may vary from preferred and/or expected dimensions and/or conditions. Example adjustments that may be made to the machine to accommodate example variances in case dimension are discussed below.

At block 1904, compensations may be made, based at least in part on a location of a seem (e.g., glued connection) in knocked-down case obtained from a manufacturer. Should the seam location vary from a preferred location, either to the left or to the right, the machine may automatically adjust a location of a pivot point of a vacuum cup mechanism having opposed vacuum cups, to thereby align with the score line.

At block 1906, adjustment may be made for case height and/or distance from bottom score line to top of case. Should the case height or bottom score line be different from the previous case, the machine may automatically adjust the top guard that provides pressure on the case while it transfers through the closing mechanism to align with the height of the case when the bottom flaps are closing/closed.

At block 1908, adjustment may be made for a major side width. Should the major side width be different than the previous case, timing of the flap folding, glue placement or tape placement may be adjusted to align to the new case length.

At block 1910, adjustment may be made for a minor side width. Should the minor side width differ from the previous case, the machine may adjust the mechanism that controls the side of the case through the machine to align with the new dimension.

At block 1912, adjustment may be made for a straightness of a seam (e.g., a glued tab) of a knocked-down case. If the seam is not straight the machine may automatically adjust the location of the pivot point of the opposing vacuum cup mechanism to align with the center point of the miss aligned seam line.

At block 1914, adjustment may be made for a score line location of a knocked-down case. If the score line location is different than the previous case, the machine may automatically adjust the position of the pick off mechanism and align the case score line with the position of the flap folding and sealing mechanism.

Figure 20:
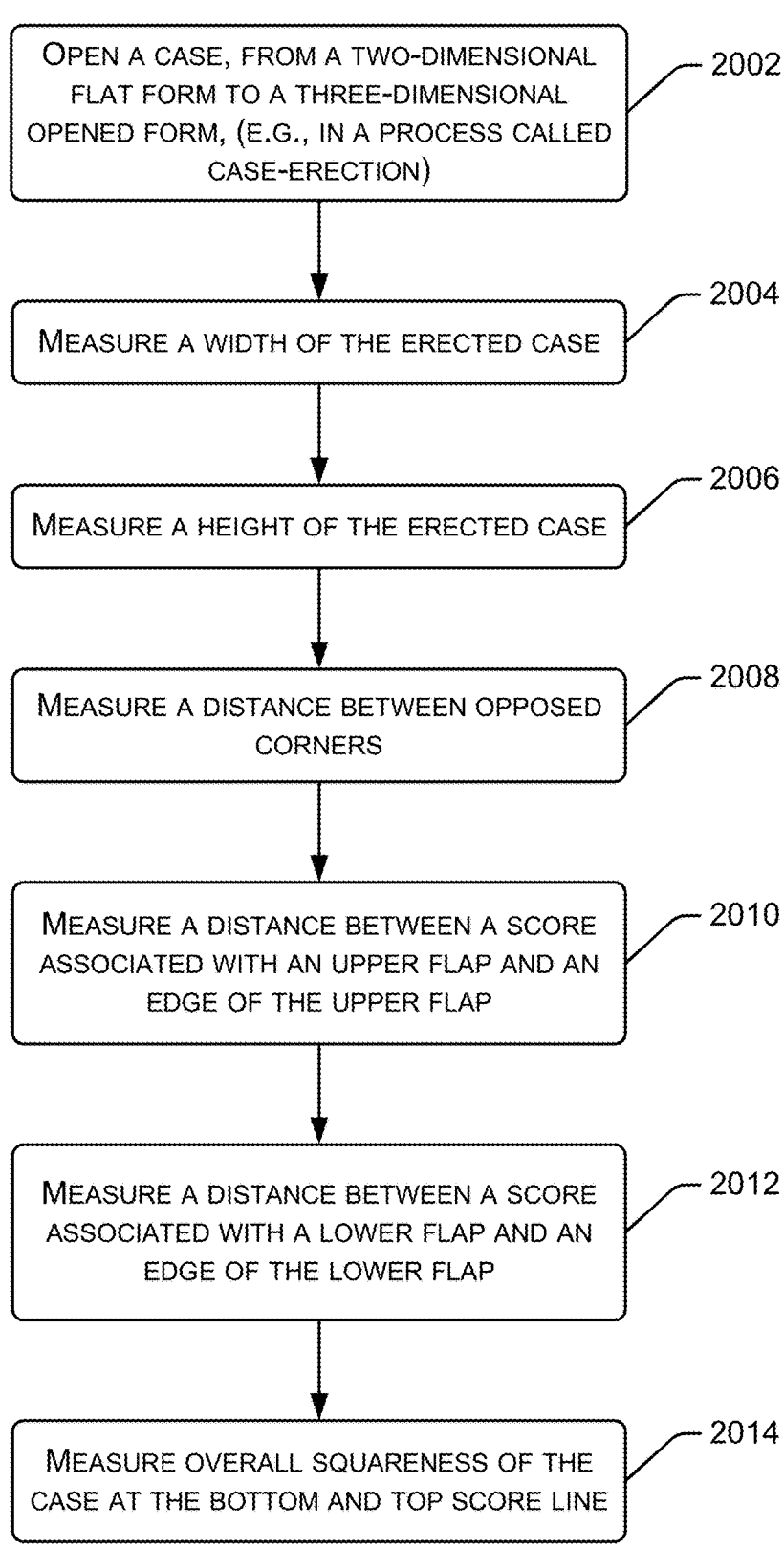
FIG. 20 is a flowchart showing a method and example operation of a system configured to measure, and/or obtain measurement data of, a case while in a folded-flat configuration and erect the case based in part on the measurements.

FIG. 20 shows a method 2000 and example operation of a system configured to measure a case while in an erected configuration.

At block 2002, a case is opened, from a two-dimensional flat form to a three-dimensional opened form, in a process called case-erection. Case-erection may include a sealing step, wherein the lower flaps are taped, glued and/or otherwise sealed. This gives the case a three-dimensional shape, and readies the case to be loaded with product. After the case is erected, dimensions of the case are measured. The dimensions may be measured by operation of one or more sensors, cameras, lasers, mechanical detectors, and/or other tools. The dimensions that may be measured may include (but are not limited to) distances between one or more of: edges of the cardboard, scores in the cardboard, and/or a manufacturer's seam along which the cardboard has been glued. The manufacturer's seam may include an outside manufacturer's seam where the cardboard edge is on top of the cardboard to which it is glued.

At block 2004, a width of the erected case is measured. In an example, a distance between opposed corners is measured.

At block 2006, a height of the erected case is measured. In an example, a distance between an edge of an upper flap to the sealed bottom of the case is measured.

At block 2008, a distance between opposed corners is measured.

At block 2010, a distance between a score associated with an upper flap and an edge of the upper flap is measured.

At block 2012, a distance between a score associated with a lower flap and an edge of the lower flap is measured.

At block 2014, a measurement of the overall squareness of the case at the bottom and top score line is measured.

Figure 21:
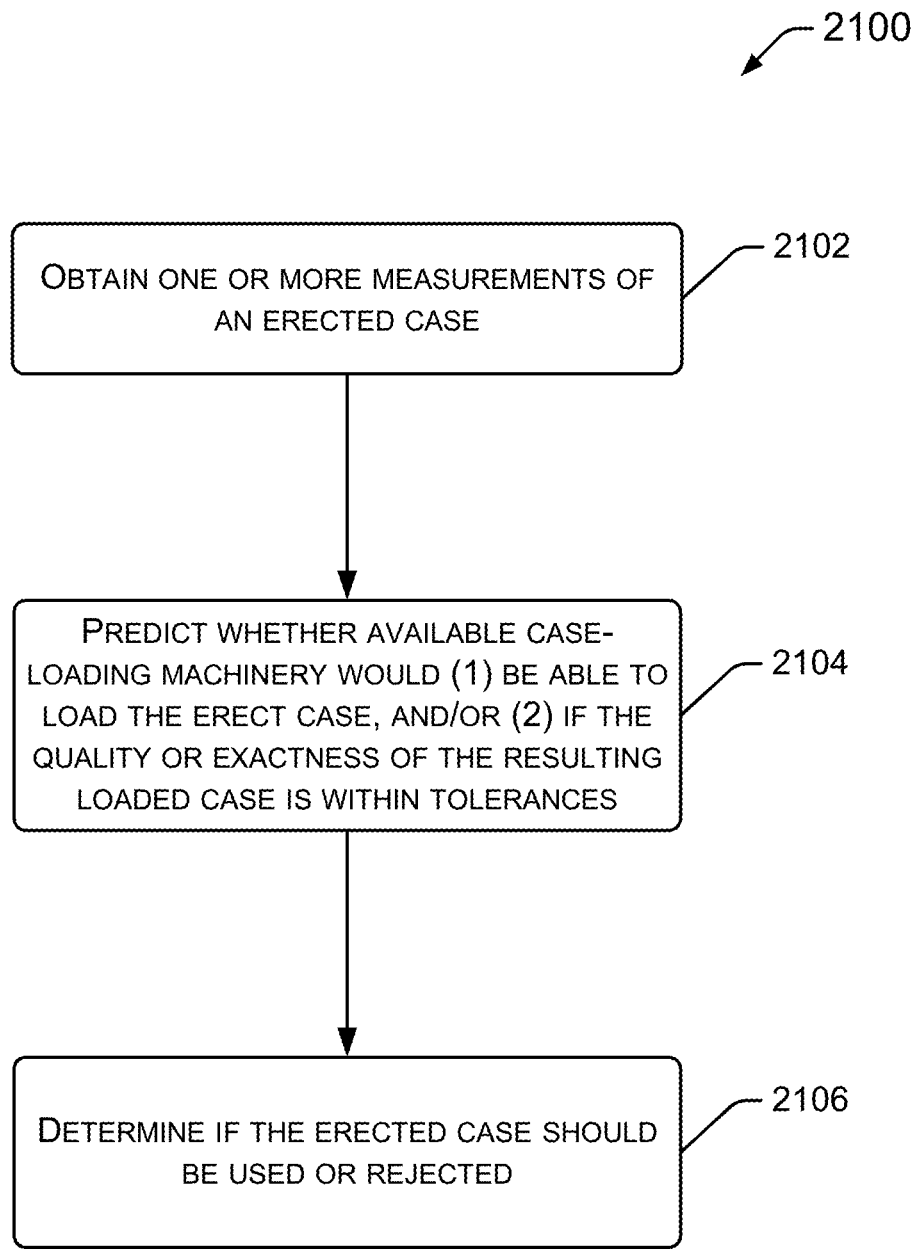
FIG. 21 is a flowchart showing a method and example operation of a system configured to measure a case while in a folded-flat configuration and erect the case based in part on the measurements.

FIG. 21 shows a method 2100 and example operation of a system configured to determine if measurements of an erected (i.e., opened) case are sufficiently within tolerances, or if the case must be discarded. Individual measurements may be considered, as well as combinations of measurements, which may cause problems collectively.

At block 2102, one or more measurements of an erected case are obtained.

At block 2104, a predication is made about whether available case-loading machinery would (1) be able to load the erect case, and/or (2) if the quality or exactness of the resulting loaded case is within tolerances. The predication(s) may be based on one or more of the measurements made, as well as any other information, such as a range of acceptable final assembled case dimensions. The prediction(s) may be somewhat simple, such as if one measurement is out of tolerances, the prediction is for failure. The prediction may be somewhat more complex, in that several measurements, none of which alone is enough to predict failure for the case, may collectively be enough to predict failure for the case.

In an example, the following aspects of a case may be measured. Case width may be measured to determine if an error (positive or negative) in the case width is exceeds a threshold difference from an established specification for the case. Case length may be measured to determine if an error (positive or negative) in the case length is exceeds a threshold difference from an established specification for the case. Case height, i.e., a distance between inside bottom and top score line, may be measured to a determine if an error (positive or negative) in the case height exceeds a threshold difference from an established specification for the case.

At block 2106, a determination is made to use the case or to reject the erected case. The determination may be based on a predicted outcome of the nature and precision of the erected case. The determination may also be based on a degree to which compensation for unfavorable measurements is expected to succeed. In some situations, a sloppy case may be more accepted than other situations.

Figure 22:
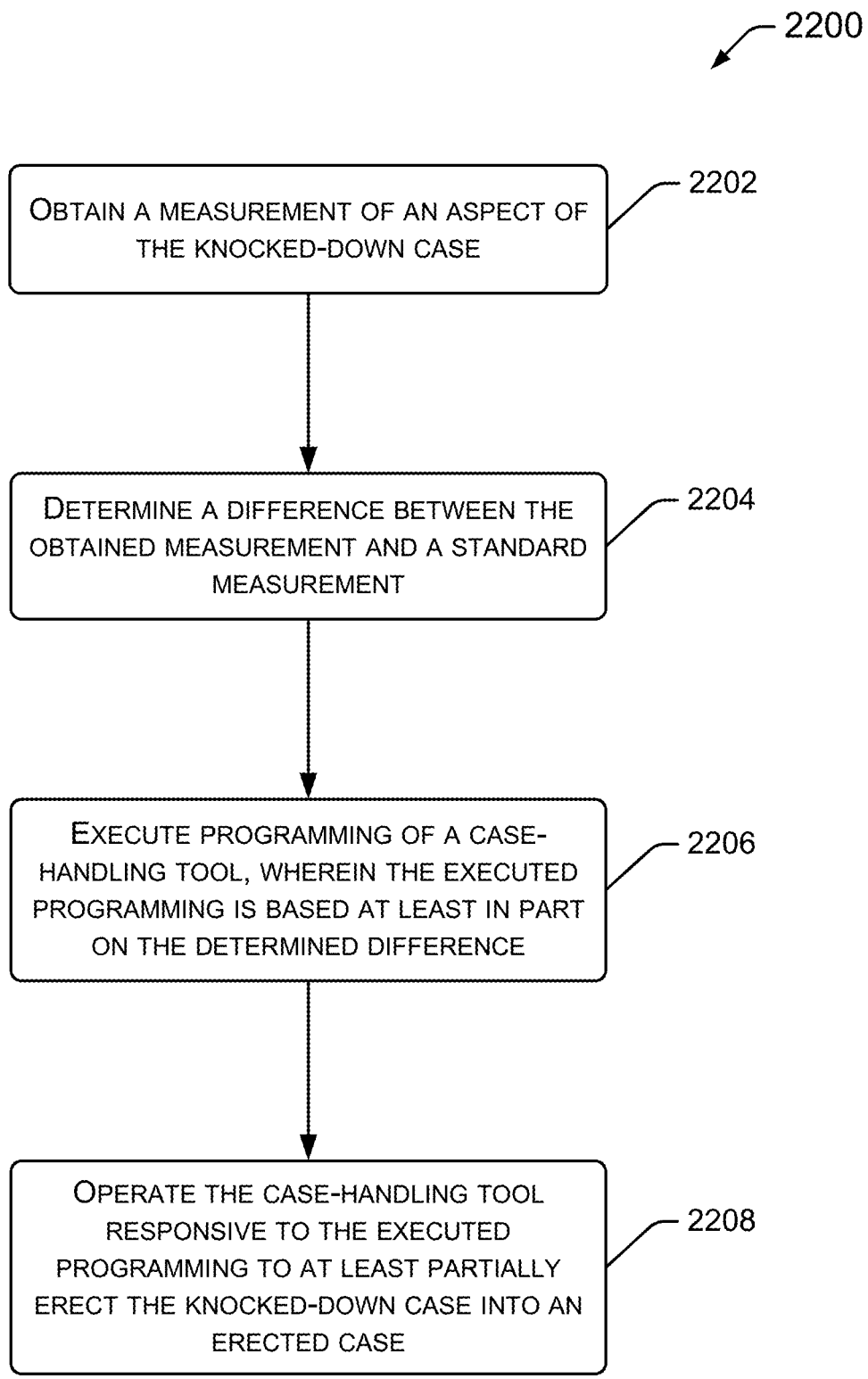
FIG. 22 is a flowchart showing a method and example operation of a system configured to measure a case while in a folded-flat configuration and erect the case based in part on the measurements.

FIG. 22 shows a method 2200 and example operation of a system configured to measure a case while in a folded-flat configuration and erect the case based in part on the measurements.

At block 2202, a measurement of an aspect of a case (e.g., the length of the major panel, or the gap between adjacent upper flaps, etc.) is obtained. The measurement may be obtained by actually measuring it (e.g., with an optical device including camera(s) and/or laser(s), a mechanical scanner (e.g., calipers), combination technology scanner) or by reading the measurement from indicia printed on the side of the case or by reading the measurement from a data file associated with the case. In an example, a reader device may read a bar code or QR code printed on the knocked-down case. The code may include measurement data for that case, including aspects that were measured (including in-specification and/or out-of-specification measurements).

At block 2204, a difference is determined between the obtained measurement and a standard measurement and/or a range of acceptable measurements. Accordingly, if one or more aspects of the knocked-down case is somewhat out-of-specification, the difference quantify the discrepancy.

At block 2204, a difference between the obtained measurement and a standard measurement or a range of standard measurements is determined. The measurement may be in-specification, in which case there may be no difference. The measurement may be out-of-specification, in which case there may be a difference. If the difference is not too large, by adjusting programming to adjust control signals, to adjust case-handling tool operation, the case may be properly erected, loaded, and/or sealed. If the difference is too large, the case may be rejected, returned to a manufacturer, and/or recycled.

At block 2206, programming is executed to control and/or to provide control signals for a case-handling tool. The programming, data used by the programming, and/or values of variables used by the programming may be based at least in part on the determined difference (e.g., difference from a standard value or range of values, as determined at block 2204). In an example, the case-handling tool may operate in a manner that is based on the measured size of the knocked-down case and/or that results in control signals that adjust case-handling to compensate for the measurements that are out-of-specification. As a result, the case-handling tool is better able to erect and/or seal a knocked-down case that is within-specification, even if the knocked-down case was out-of-specification.

At block 2208, the case-handling tool is operated responsive to the executed programming to at least partially erect the knocked-down case into an erect case, to load the erected case with products, and/or to seal the loaded case.

Figure 23:
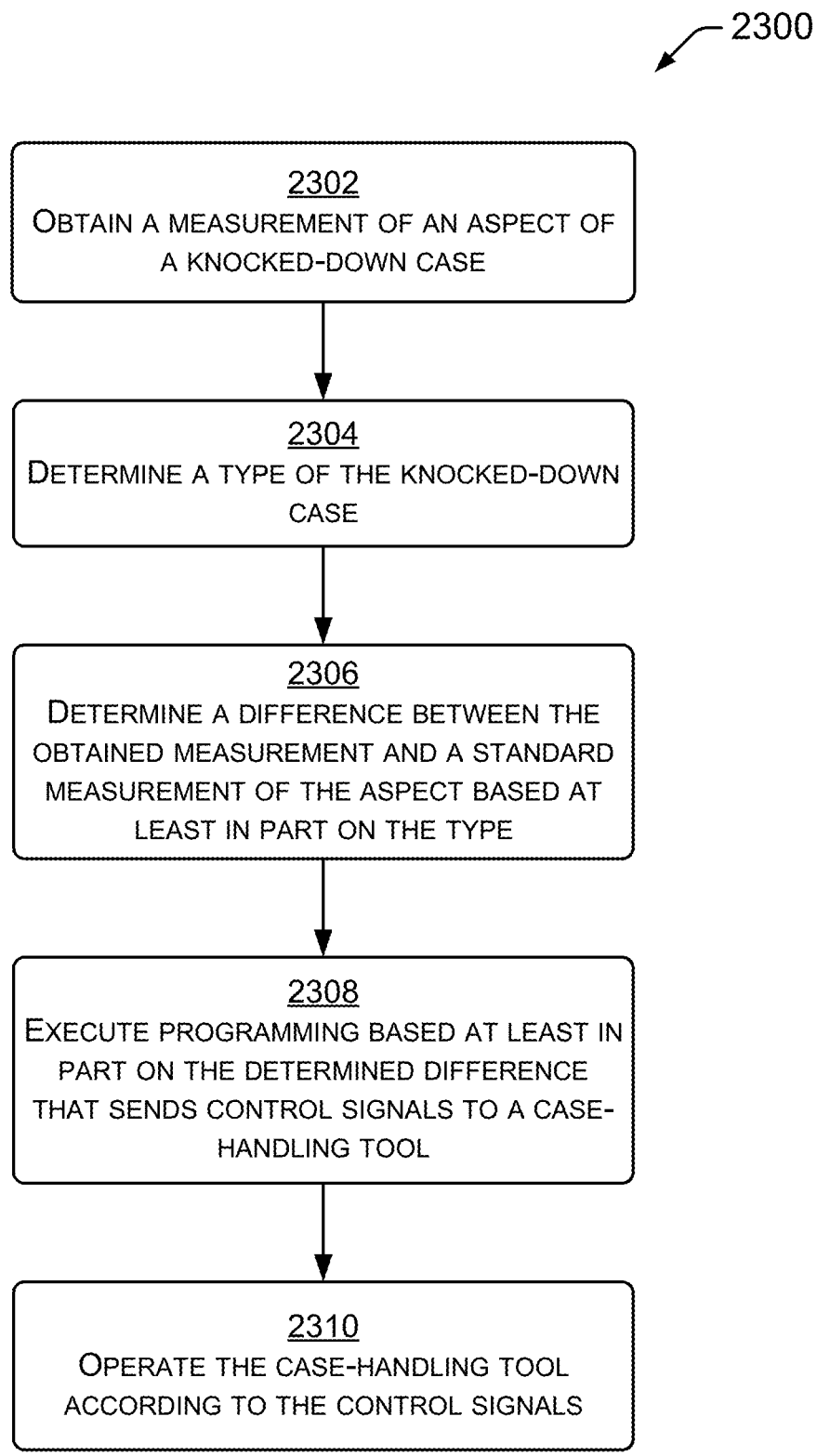
FIG. 23 is a flowchart showing a method and example operation of a system configured to measure a case while in a folded-flat configuration and erect the case based in part on the measurements.

FIG. 23 shows a method 2300 and example operation of a system configured to measure a case while in a folded-flat configuration and erect the case based in part on the measurements.

At block 2302, a measurement of an aspect of a case is obtained. The measurement may be obtained by any means, such as those mentioned at block 2202 of FIG. 22.

At block 2304, a type of case is determined. If a particular type of case is determined, the case type may be used to obtain the standard measurement and/or range of measurements for such a case, such as from a specification database 106, specification website, etc. The type of case may be obtained from data on the case size, data printed on the case, etc. Thus, the type of case can assist in finding the standard measurement and/or range of standard measurements.

At block 2306, a difference is determined between the obtained measurement and a standard measurement and/or a range of acceptable measurements.

At block 2308, programming may be configured, such as by using variables, data and/or program statements, in a manner that is based at least in part on the difference in measurement(s) of the case and standard measurements and/or ranges of standard measurements. Execution of the programming generates and sends control signals to a case-handling tool. The programming and/or resulting control signals may be based at least in part on the difference that was determined.

At block 2310, one or more case-handling tools are operated according to the control signals. The case-handling tools may erect the case, fill the case with product, and/or seal the case.

Figure 24:
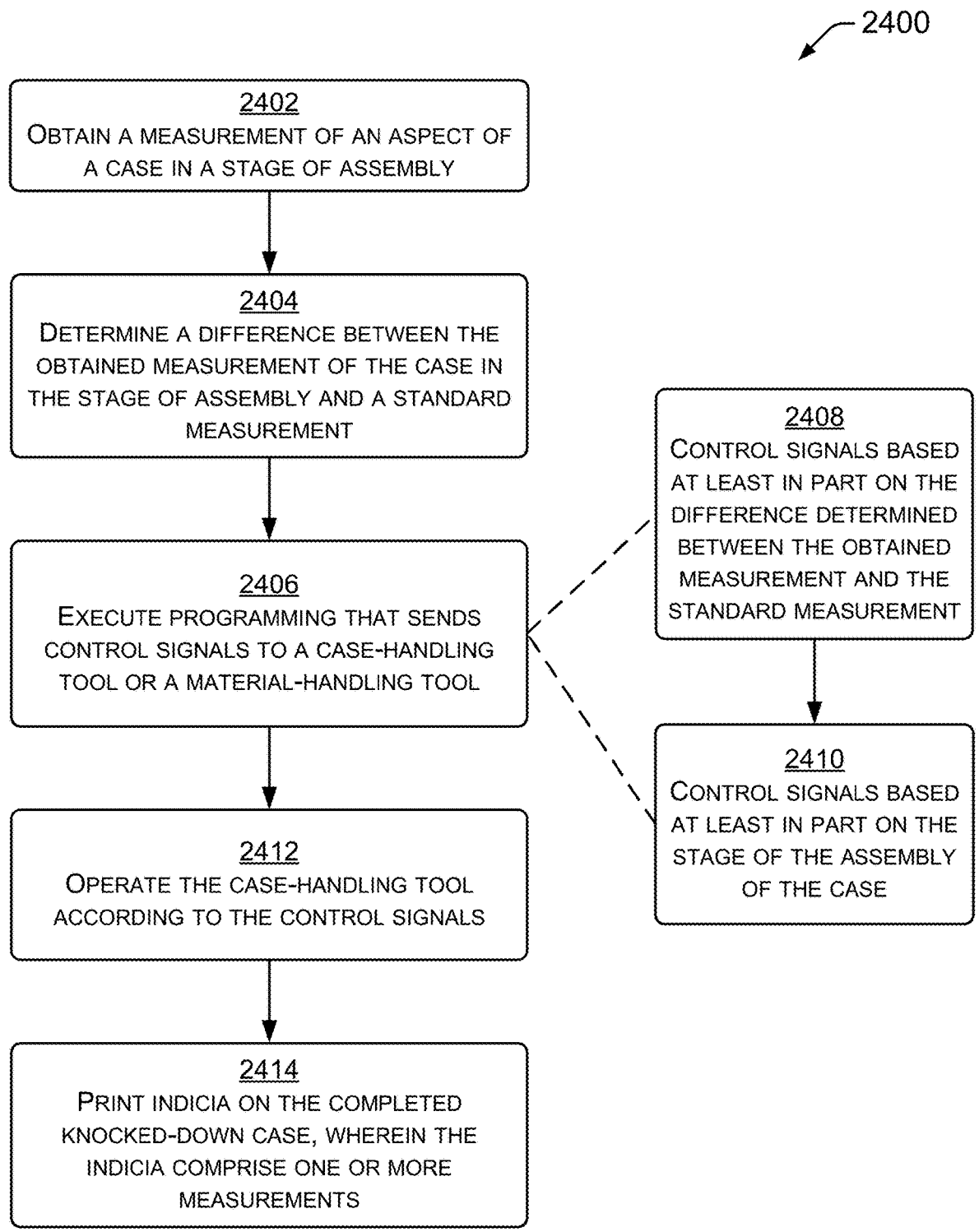
FIG. 24 is a flowchart showing a method and example operation of a system configured to measure one or more aspects of a case in a stage of assembly, determine differences between the measurements and specifications, adjust programming, and operate case-handling tools.

FIG. 24 shows a method 2400 and example operation of a system configured to measure one or more aspects a case in a stage of assembly, determine differences between the measurements and specifications, adjust programming, and operate case-handling tools.

At block 2402, at least one measurement of an aspect of a case in a stage of assembly is measured. The measurement may be of a knocked-down case or raw material of a knocked-down case, such as piece of cardboard (or other material). Examples of such measurements may include (but are not limited to) measurements of: a cut blank; a cut and scored blank; a cut, scored and folded blank; or of a cut, scored, folded and glued blank; etc. The measurement may be related to the direction (i.e., orientation) of the corrugations in the cardboard, distances between any two of cut edges, scores, folds etc. One or more measurements may be made after one or more actions, such as material rotation, one or more cuts of the material, one or more scores of the material, one or more folds of the material, one or more glued or taped seals of portions of the material, etc.

At block 2404, a difference may be determined between the obtained measurement and a standard measurement and/or a range of acceptable measurements.

At block 2406, programming may be executed to send control signals to case-handling tool(s) and/or material handling tool(s). The programming may be based at least in part on the differences in measured dimensions from expected dimensions. In an example, if a flap is slightly longer than a specification, then programming may send control signals to a tape head that compensate for the added length when taping the flap closed. In examples, the programming may operate the tool(s) based on one or more factors. In the example of block 2408, control signals may to tool(s) may be based at least in part on difference(s) between measured aspects of the knocked-down case or material. In the example of block 2408, the programming is based at least in part on the difference between obtained measurements and standard/preferred measurements and/or ranges of measurements. In the example of block 2410, the stage of the assembly of the case may be considered in the programming. Different case-handling and/or case-manufacturing tools may be configured to perform different tasks, and differences in measurements (e.g., from block 2404) may be relevant only to certain tools. For example, programming for a tool configured to score cardboard may be customized for a particular case at a point in its construction after it has been cut, but before it has been folded (at the score).

At block 2412, the case-handling or material-handling tool(s) are operated according to control signals that resulted as programming is executed. After a plurality of tools have been utilized a knocked-down case (e.g., a case 10 of FIGS. 1A and 1B) is created.

At block 2414, indicia may be printed on the completed knocked-down case. The indicia may include human- and/or machine-readable information. In an example, a QR code may be printed on the knocked-down case. The QR code tells the user of the case the dimensions of one or more (e.g., many) dimensions of aspects of the knocked-down case. This allows the scanning system 108 (e.g., in FIG. 1C) to read the QR code without actually measuring the case. Accordingly, the tools and actions described in FIGS. 2 through 15 may be performed based on data in the QR code. If such a code and/or indicia is not printed on the constructed knocked-down case, the scanning system 108 may have to make the actual measurements used by the tools to perform the actions described in FIGS. 2 through 15.

Figure 25:
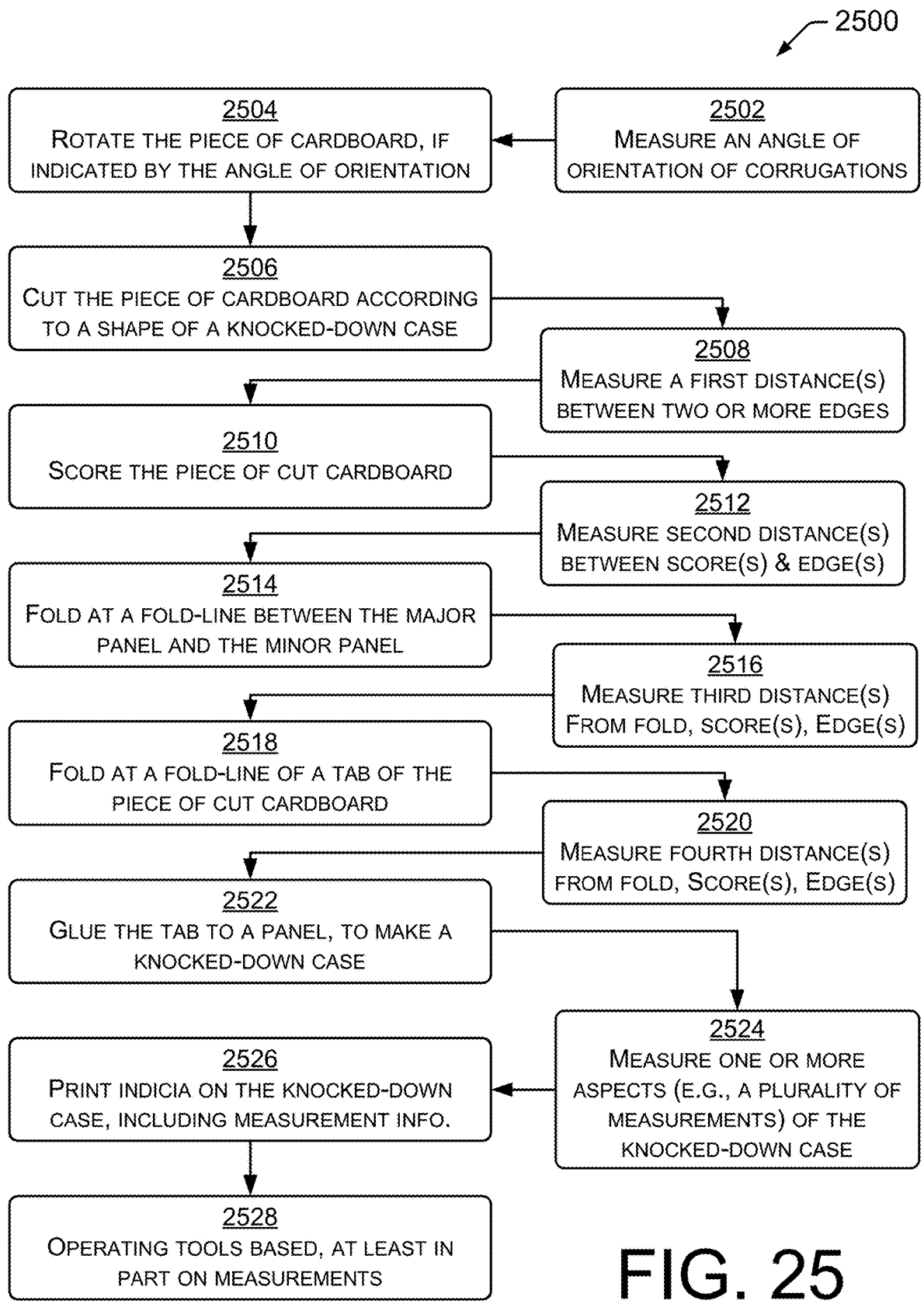
FIG. 25 is a flowchart showing a method and example operation of a system configured to manufacture knocked-down cases.

FIG. 25 shows a method 2500 and example operation of a system configured to measure one or more aspects of a case (or materials to make a case) in stages of manufacture, determine differences between the measurements and specified measurements or ranges of measurements, adjust programming, data, variables, etc., and operate tools according to the adjusted programming, variables, parameters, etc. In an example, the method includes some or all of: measuring an angle of the cardboard corrugations; rotating if necessary; cutting the cardboard into a shaped needed to make the case; measuring; scoring fold-lines; measuring; folding between a major panel and a minor pane; measuring; folding a tab; measuring; gluing the tab to a major or minor panel; measuring the knocked-down case; printing indicia on the case, indicating at least some of the measurements. One or more of the rotating, cutting, scoring, folding of major/minor panel, folding of the tab, and/or gluing of the tab may be performed by respective tools using information derived at least in part on the measuring steps. Accordingly, the tools operate with more precision and effectiveness than if they made assumptions based on typical outcomes of previous operations. By printing indicia on the resultant knocked-down case, machines or tools that later erect the knocked-down case will be able to operate with increased precision.

After each measuring step 2502, 2508, 2512, 2516, 2520, 2524, the data from the measuring may be used to adjust the operation of case-handling tools, case-manufacturing tools, etc. Thus, the operation of each tool may be adjusted as indicated by the measurements, such as to compensate for any discrepancy or abnormality in the size, shape, orientation, etc., of the workpiece.

At block 2502, an angle of the orientation of corrugations of a piece of cardboard is measured. In an example, optical techniques, in some cases involving back-lighting, lasers, etc., can be used to make the measurement.

At block 2504, if indicated by the angle of orientation, the piece of cardboard may be rotated to correct the angle. Typically, the corrugations will be oriented "north and south" or "east and west" with respect to machinery involved.

At block 2506, the piece of cardboard may be cut according to a shape of a knocked-down, but not yet assembled, case (i.e., cardboard box). The cut may be made by a tool that cuts the perimeter with a blade, or in one action in the manner of a "cookie cutter." The cut may be made according to input from the measurement made at block 2502, such as by rotating the cutter if needed, to compensate or workpiece orientation. Accordingly, a cut "blank" is formed. If the cardboard was not rotated at block 2504, the tool may be rotated at block 2506.

At block 2508, distances between two or more edges of the cardboard blank are measured. In an example, many of the distances identified in FIG. 1B are measured. Additional and/or different distances can be measured depending on system design requirements. Since the blank has not yet been folded, measurements may be made from one side of the blank to the other side, etc.

At block 2510, the cardboard blank is scored in one or more locations, to result in creation of one or more fold-lines. Example, scoring and fold-lines are seen in FIGS. 1A, 1B, 1C. The scoring may be performed using as input the measurements made at block 2508.

At block 2512, distances between combinations of edges and fold-lines are measured. Example measurements are seen in FIG. 1B. Since the blank has not yet been folded, measurements may be made from one side of the blank.

At block 2514, the blank may be folded at a scored fold-line between a major panel and a minor panel. This effectively folds the blank in half. The folding may be made using as input the measurements made at block 2512.

At block 2516, distances between combinations of the fold, scored fold-lines, and edges are measured. Example measurements are seen in FIG. 1B.

At block 2518, a tab, which is connected to either a major or minor panel by a fold-line, is folded. Alternatively, a score between a major and minor panel is folded. The folding may be performed according the measurements made at block 2516.

At block 2520, distances between combinations of the folds, scored fold-lines and edges are measured. Example measurements are seen in FIG. 1B.

At block 2522, if the tab is connected to a major panel at a fold, it is glued to a minor panel. If the tab is connected to a minor panel at a fold, it is glued to a major panel. The connection of the tab to a panel may be made with glue or tape and may be made using the measurements made at block 2520 as input. With the tab glued, the folded blank (having been cut, scored, folded and glued) is now a knocked-down case.

At block 2524, distances between combinations of the glued seem, the folds, scored fold-lines and edges are measured. Example measurements are seen in FIG. 1B.

At block 2526, indicia (e.g., QR code 112 of FIG. 1C) may be printed on the knocked-down case. The printing may be made using any of the measurements made (e.g., measurements made at block 2524) as input to the printing process. The indicia may be configured to transfer information about dimensions of the case to machinery that erect, fill, and/or seal the case. Accordingly, such information may obviate the need for such machinery to measure the knocked-down blank, while still allowing the machinery to benefit from such information. In an example, a QR code may convey the information from the manufacturer of a knocked-down case to the buyer/user/consumer of the knocked-down case. In the example of FIG. 1C, the scanner 108 may read the QR code 112 if available, or scan the dimensions (e.g., using camera(s) and laser(s)) if the code is unavailable or unreadable. In a second example, a QR code, bar code, etc., may convey a webpage address, and the dimension-information may be obtained from servers (e.g., servers 116 of FIG. 1D) hosting the page.

In a further example of block 2526, each knocked-down case may have an ID number. Additionally, each knocked-down case may publish its own dimensions, such as by QR code, website link, etc. And further, knocked-down cases may also provide ID numbers and/or dimensional information about other cases, such as knocked-down cases that are adjacent to themselves in a stack or cassette of cases. Accordingly, if case-erecting machinery reads a QR code of a first case, it may also obtain the dimensional information of the next case in the cassette. This may assist the case-erecting machinery to move into a preferred position even before the next case is scanned. In an example, the leading minor flap plow may adjust to a height of a second case after plowing a first case, using information obtained from the first case, even before the second case is scanned or read.

Similarly, a website may know the dimensional information for all cases in a cassette, and may provide that information as soon as it is useful.

In the example of block 2528, the operation of any tools (case-handling, case-manufacturing, etc.) may be performed, adjusted, etc., according to data obtained from any of the measuring steps and the sensors, cameras, lasers, etc., used in those steps. Thus, rotating, cutting, scoring, folding, gluing, taping, printing, etc., may be performed according programming, variable-settings, data, etc., that is based at least in part on one or more of the measuring steps. While a plurality of measuring steps are shown and discussed, additional, other, and/or fewer measuring steps could be performed, as indicated by

CONCLUSION

While the term "cardboard" is used in the discussion as the material used to make cases or cartons, within this document cases or cartons may be made using any material used in commerce and such materials referred to colloquially as "cardboard." Also, while individual measured distances are recited, such measurements may be made in several locations. For example, the height of a flap may be measured from the cardboard edge to the score in several locations, to confirm that the score of the flap is parallel to the edge of the flap.

The terms knocked-down and/or folded-flat case may refer to cardboard or other boxes that have not yet been erected, and that are typically stacked until erected, loaded, and sealed.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method for knocked-down case manufacture, comprising:
   measuring an angle of orientation of corrugations in a piece of cardboard;
   rotating the piece of cardboard, if indicated by the angle of orientation, to orient the corrugations of the piece of cardboard to a specified orientation;
   cutting the piece of cardboard according to a shape of a knocked-down case to thereby form a cut piece of cardboard;
   measuring a first distance between a first edge and a second edge of the piece of cut cardboard;
   scoring the piece of cut cardboard to create a fold-line between a major panel and a minor panel of the piece of cut cardboard, and to create a fold-line between the major panel and a flap of the major panel of the piece of cut cardboard, wherein the scoring is performed by a scoring tool;
   measuring a second distance between a score of the piece of cut cardboard and an edge of the piece of cut cardboard;
   folding at a fold-line between the major panel and the minor panel to thereby create a fold, wherein the folding is performed by a folding tool;
   measuring a third distance between the fold and a score of the piece of cut cardboard;
   folding at a fold-line of a tab of the piece of cut cardboard, wherein the folding is performed by the folding tool;

measuring a fourth distance between the fold of the tab and an edge of the piece of cut cardboard;
gluing the tab to a panel of the piece of cardboard, wherein the gluing is performed by a gluing tool, to form the piece of cut cardboard into a knocked-down case;
measuring the knocked-down case; and
printing indicia on the knocked-down case, wherein the indicia comprises information about one or more measurements;
wherein operation of at least one of the scoring tool, the folding tool, and the gluing tool was based at least in part according to input from the measuring of the first distance, the second distance, the third distance, or the fourth distance.

2. The method of claim 1, wherein measuring the first distance between the first edge and the second edge of the piece of cut cardboard comprises:
measuring between the first edge and the second edge in at least two places to obtain two measurements; and
using the two measurements as one indicator to determine if the cutting of the piece of cardboard was accurate.

3. The method of claim 1, wherein scoring the piece of cut cardboard comprises:
scoring a fold-line in a location based at least in part on that a distance of that location from at least two edges.

4. The method of claim 1, additionally comprising:
scoring the piece of cardboard based at least in part on measurements between edges of the piece of cut cardboard;
folding the piece of cardboard based at least in part on measurements performed after the scoring of the piece of cut cardboard; and
gluing the tab to the panel based at least in part on measurements performed after the folding.

5. The method of claim 1, wherein measuring the knocked-down case comprises:
measuring between a fold and an edge;
measuring between two edges; and
measuring between two folds.

6. A method for knocked-down case manufacture, comprising:
cutting a piece of cardboard according to a shape of a knocked-down case to thereby form a cut piece of cardboard;
measuring a first plurality of distances between edges of the piece of cut cardboard;
scoring the piece of cut cardboard to create a plurality of fold-lines, wherein locations that are scored are based at least in part on the first plurality of measured distances;
measuring a second plurality of distances between scores and edges of the piece of cut cardboard;
folding at a fold-line between a major panel and a minor panel to thereby create a fold, wherein the fold is made based at least in part based on the second plurality of measured distances;
measuring a third plurality of distances between the edges of the piece of cut cardboard, the plurality of fold-lines, and the fold between the major panel and the minor panel;
folding at a fold-line of a tab of the piece of cut cardboard, wherein the fold is made based at least in part based on the third plurality of measured distances; and
gluing the tab to a panel of the piece of cardboard to form a knocked-down case.

7. The method of claim 6, additionally comprising:
measuring the knocked-down case; and
sending the measurements to a case-erection system.

8. The method of claim 6, additionally comprising:
measuring the knocked-down case; and
printing indicia on the knocked-down case, wherein the indicia comprise information about one or more measurements.

9. The method of claim 6, additionally comprising:
measuring both sides of the knocked-down case; and
printing indicia on the knocked-down case, wherein the indicia comprise information about one or more measurements.

10. The method of claim 6, additionally comprising:
measuring an angle of orientation of corrugations in the piece of cardboard; and
rotating the piece of cardboard, if indicated by the angle of orientation, to orient the corrugations of the piece of cardboard to a specified orientation.

11. The method of claim 6, additionally comprising:
determining, after each measuring step, if the knocked-down case can be successfully completed; and
discarding the piece of cardboard if the knocked-down case cannot be successfully completed.

12. The method of claim 6, additionally comprising:
determining, after measuring the first plurality of distances, if the knocked-down case can be successfully completed;
determining, after measuring the second plurality of distances, if the knocked-down case can be successfully completed; and
determining, after measuring the third plurality of distances, if the knocked-down case can be successfully completed.

13. A method for knocked-down case manufacture, comprising:
cutting a piece of cardboard according to a shape of a knocked-down case to thereby form a cut piece of cardboard;
scoring the cut piece of cardboard to create a plurality of fold-lines;
folding at a fold-line between a major panel and a minor panel to thereby create a fold;
folding at a fold-line of a tab of the cut piece of cardboard;
gluing the tab to a panel of the cut piece of cardboard to form a knocked-down case;
measuring the knocked-down case to obtain measurements, wherein measuring the knocked-down case comprises:
measuring a height and a length of the major panel;
measuring a height and a length of the minor panel;
measuring a height and a length of upper and lower flaps for the major panel; and
measuring a height and a length of upper and lower flaps for the minor panel; and
providing the measurements to a case-erection system.

14. The method of claim 13, wherein providing the measurements to the case-erection system comprises:
printing indicia on the knocked-down case, wherein the indicia comprise the measurements.

15. The method of claim 13, wherein providing the measurements to the case-erection system comprises:
printing indicia on the knocked-down case, wherein the indicia comprise:
the measurements of the knocked down case; and
measurements of a second knocked-down case.

16. The method of claim 13, wherein providing the measurements to the case-erection system comprises:
   sending the measurements to a remote server.

17. The method of claim 13, wherein measuring the knocked-down case comprises:
   measuring both sides of the knocked-down case.

18. The method of claim 13, additionally comprising:
   measuring an angle of orientation of corrugations in the piece of cardboard; and
   rotating the piece of cardboard, if indicated by the angle of orientation, to orient the corrugations of the piece of cardboard to a specified orientation.

19. The method of claim 13, additionally comprising:
   determining, after measuring the knocked-down case to obtain the measurements, if the knocked-down case is within a specification; and
   discarding the knocked-down case if it is not within the specification.

\* \* \* \* \*